(12) United States Patent
Fisher et al.

(10) Patent No.: US 9,488,160 B2
(45) Date of Patent: Nov. 8, 2016

(54) DISPATCHABLE POWER PLANT AND METHOD FOR USING THE SAME

(71) Applicant: ORMAT TECHNOLOGIES INC., Reno, NV (US)

(72) Inventors: Uriyel Fisher, Haifa (IL); Asaf Mendelovitz, Toronto (CA); Dov Berger, Rehevot (IL); Yoram Bronicki, Rehovot (IL); Zvi Krieger, Kfar Veradim (IL); Lucien Y. Bronicki, Yavne (IL)

(73) Assignee: Ormat Technologies Inc., Reno, NV (US)

( * ) Notice: Subject to any disclaimer, the term of this patent is extended or adjusted under 35 U.S.C. 154(b) by 138 days.

(21) Appl. No.: 14/207,193

(22) Filed: Mar. 12, 2014

(65) Prior Publication Data

US 2014/0260246 A1 Sep. 18, 2014

Related U.S. Application Data

(63) Continuation-in-part of application No. 13/614,759, filed on Sep. 13, 2012, now Pat. No. 9,331,547, and a continuation-in-part of application No. 14/029,599, filed on Sep. 17, 2013, which is a continuation-in-part of application No. 13/474,375, filed on May 17, 2012, now Pat. No. 9,115,604, which is a continuation-in-part of application No. 12/624,063, filed on Nov. 23, 2009, now Pat. No. 8,193,659, which is a continuation-in-part of application No. 12/621,899, filed on Nov. 19, 2009, now abandoned.

(51) Int. Cl.
*F03G 7/04* (2006.01)
*F03G 6/00* (2006.01)

(52) U.S. Cl.
CPC ............... *F03G 7/04* (2013.01); *F03G 6/005* (2013.01); *Y02E 10/46* (2013.01)

(58) Field of Classification Search
CPC .......... F03G 7/04; F03G 6/005; Y02E 10/46
See application file for complete search history.

(56) References Cited

U.S. PATENT DOCUMENTS

| 4,192,144 A | 3/1980 | Pierce |
| 8,087,245 B2 | 1/2012 | Quero et al. |
| 2006/0048770 A1* | 3/2006 | Meksvanh .......... E21B 41/0057 126/620 |
| 2006/0089752 A1* | 4/2006 | Voigt .................... F04C 13/008 700/282 |
| 2011/0187126 A1* | 8/2011 | Nakamura ................ F03G 7/04 290/1 R |
| 2012/0291433 A1 | 11/2012 | Meng et al. |

FOREIGN PATENT DOCUMENTS

WO WO 2008/022407 A1 2/2008

OTHER PUBLICATIONS

International Search Report issued Dec. 2, 2015 in PCT/IB15/00304.

* cited by examiner

*Primary Examiner* — Audrey K Bradley
(74) *Attorney, Agent, or Firm* — Oblon, McClelland, Maier & Neustadt, L.L.P

(57) ABSTRACT

The present invention provides a method for producing load-following power using low to medium temperature heat source fluid comprising the steps of: reducing the power level produced by a Rankine cycle power plant producing load-following power operating on a low to medium temperature heat source fluid during one period of time; storing heat not used during the first period of time; and using the heat stored for producing power during a second period of time.

13 Claims, 24 Drawing Sheets

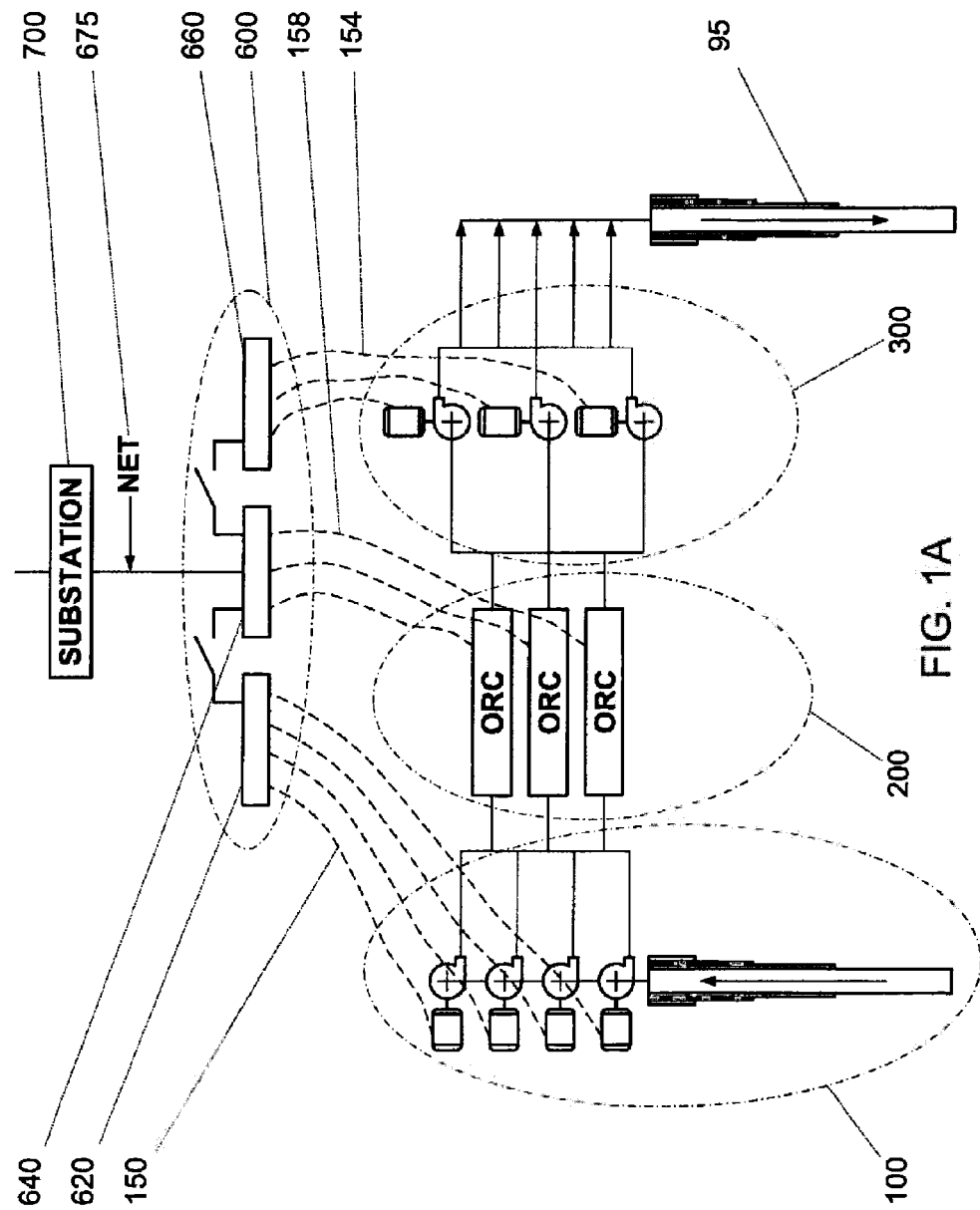

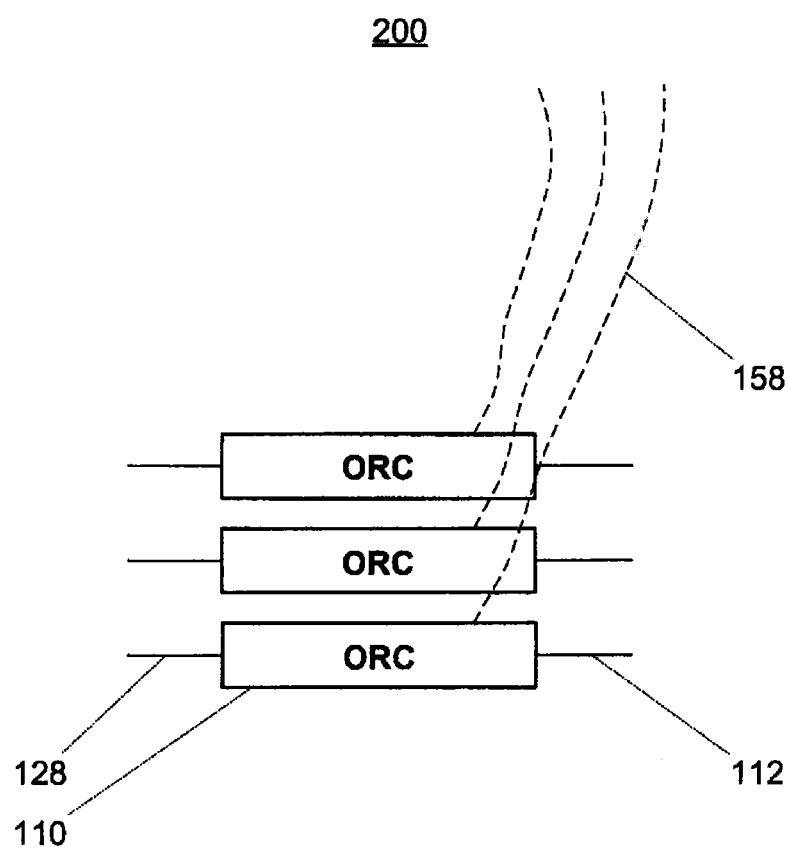
FIG. 1A"

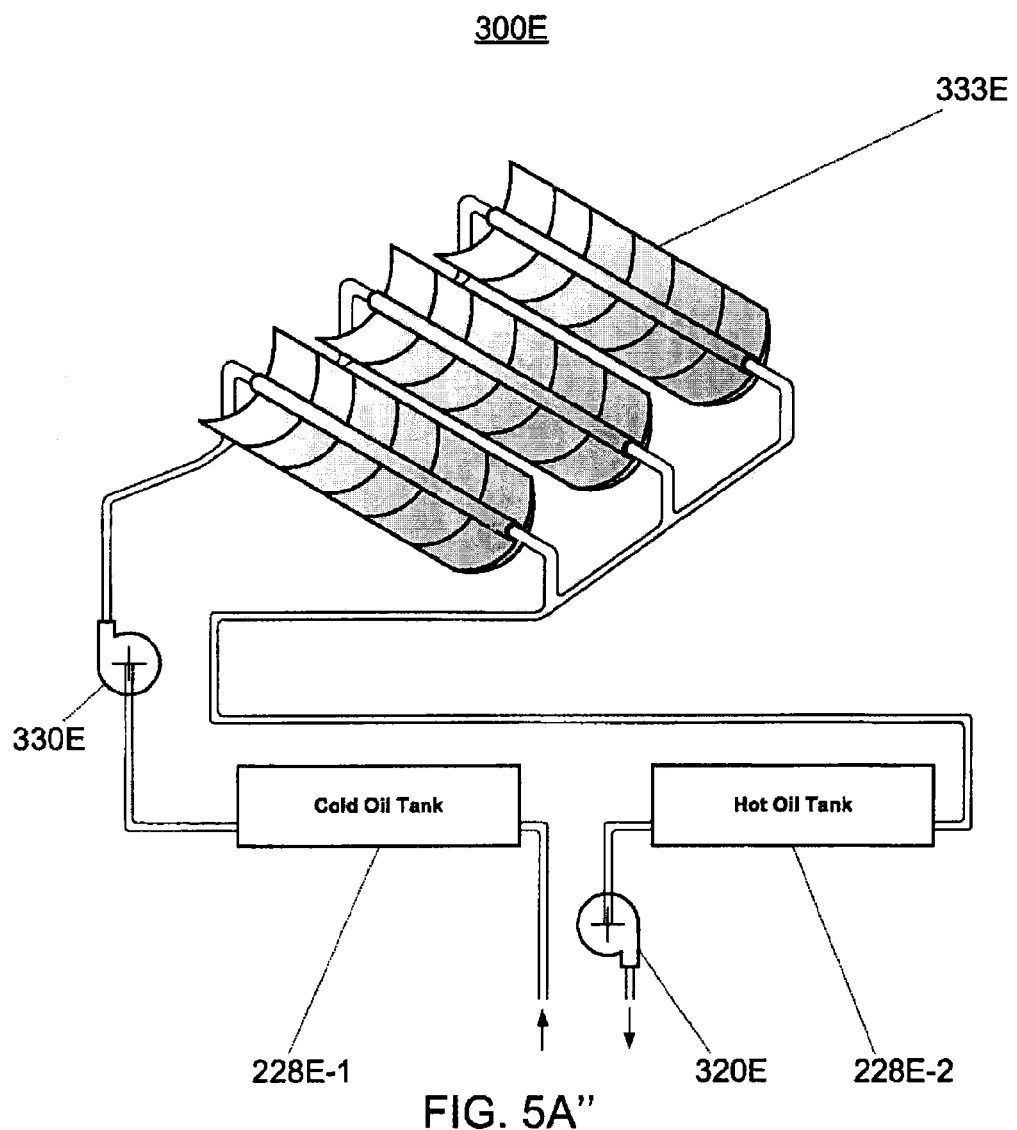
FIG. 5A"

DISPATCHABLE POWER PLANT AND METHOD FOR USING THE SAME

FIELD

The present invention relates to the field of power plants. More particularly, the invention relates to a geothermal power plant or plants and the method for using the same and furthermore more specifically to a dispatchable power plant and a method for using the same.

BACKGROUND

The desire to reduce Green House Gas emissions and lower dependency on fossil fuels enhanced the introduction of intermittent renewable energy sources such as Wind, solar PV, hydroelectric and others into the grid. While this trend has positive effects towards those tasks, it is also accompanied by new type of grid problems such as instability, fluctuations and mismatch between demand and production of electricity. Forecasts made up to 2020 and on show that the massive introduction of renewables results in a significant quantity of surplus renewable energy during day time where total supply may exceed total demand. The overcapacity that may last for hours during the daytime is a burden that must be solved. Cutting off any power producing facility and forcing it to work at reduced capacity reduce the plant efficiency and potential income. Since large electricity storage is unavailable at this time the other option is to create new immediate users to utilize the surplus energy. Such users are: electric vehicle charging, pumped hydro and ice making for midday cooling. However, all those are limited in capacity. In face of the inefficiency of forced load following, every effort that can be made to switch off or store large amount of production potential such as heat or pressure head without causing technical or economic damage is welcomed.

In spite of their low thermodynamic potential, low grade heat sources like geothermal and industrial waste-heat-recovery, which drive steam and Rankine Cycle Power Plants, are being more widely used these days not only because they do not require fossil fuel, but also because, contrary to solar and wind, they provide base-load and not intermittent power.

The geothermal and recovered waste heat plants share the grid load-following and mainly the demand for dispatching problem with all grid connected power plants.

As these heat sources flow continuously and preferably should not be disturbed, the dispatching is very inefficient when the heat which is not used is lost.

In case grid control demands to reduce production, the heat supply to the Rankine cycle must be reduced to adjust the output to the demand but the brine production pump or steam well valves cannot always work in varying flow rate for fear of damage to the well and in such cases, in order to minimize well suction problems the production well continues to pump the regular rate of hot fluid supply.

This is done by having the heat carrying fluid bypass the Rankine Cycle (FIG. 1b) and later it is injected into the injection wells together with the heat depleted fluid exiting from the Rankin cycle that worked on partial load.

Because the wasted heat has to be disposed of, and in case of geothermal, production and injection pumps are, in site specific cases, not stopped without damaging the wells, the dispatching is inefficient because the lost heat is not recoverable.

Consequently, the present invention provides a power plant that overcomes the shortcomings of prior art power plants particularly those of geothermal power plant.

Other advantages of the invention will become apparent as the description proceeds.

SUMMARY

The present invention provides a method for producing load-following power using low to medium temperature heat source fluid comprising the steps of reducing the power level produced by a Rankine cycle power plant producing load-following power operating on a low to medium temperature heat source fluid during one period of time; storing heat not used during the first period of time; and using the heat stored for producing power during a second period of time.

The present invention is also directed to a load-following power plant using low to medium temperature heat source fluid comprising: means for reducing the power level produced by said load-following power plant using low to medium temperature heat source fluid during a first period of time; a heat storage for storing heat not used during said first period of time; and means for using the heat stored in said heat storage for producing power during a second period of time.

BRIEF DESCRIPTION OF THE DRAWINGS

In the drawings:

FIG. 1A' is a diagram showing a portion of the geothermal power plant, according to the embodiment of the present invention described with reference to FIG. 1A;

FIG. 1A" is a diagram showing a further portion of the geothermal power plant, according to the embodiment of the present invention described with reference to FIG. 1A;

FIG. 1A''' is a diagram showing an additional portion of the geothermal power plant, according to the embodiment of the present invention described with reference to FIG. 1A;

FIG. 2' is a diagram showing a portion of the geothermal power plant, according to the embodiment of the present invention described with reference to FIG. 2;

FIG. 5A' is a diagram of a portion of the geothermal power plant, according to the embodiment of the present invention described with reference to FIG. 5A;

FIG. 5A" is a diagram of a further portion of the geothermal power plant, according to the embodiment of the present invention described with reference to FIG. 5A;

Note that similar reference numerals refer to similar components.

DETAILED DESCRIPTION

Some embodiments of the present invention are described with reference to the figures that are detailed hereafter.

Figure 1A:
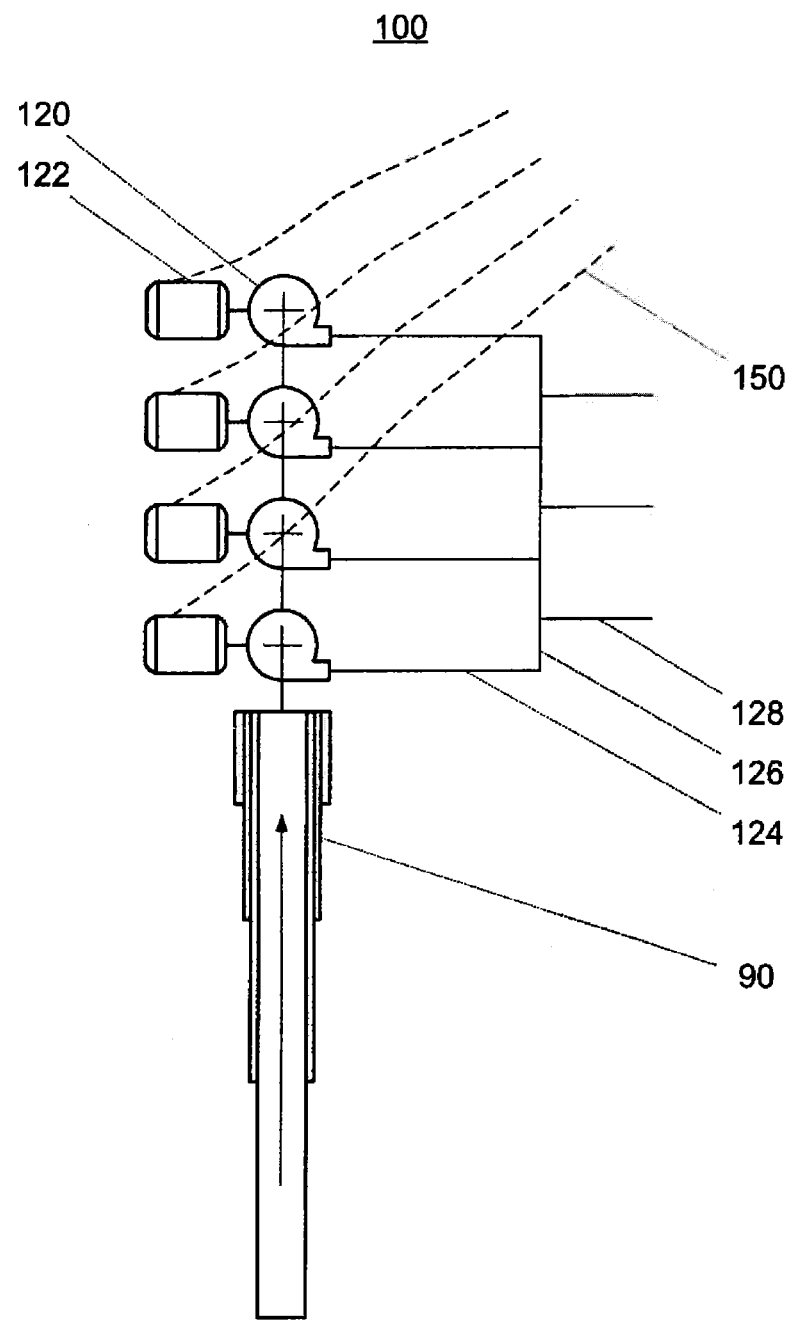
FIG. 1A is a diagram of a geothermal power plant, according to one embodiment of the present invention.

FIG. 1A presents a geothermal power plant layout-1000. The power plant comprised of four main parts. The production part 100, the power conversion section 200 the handling of the heat depleted brine 300 and the power & control section 600. The plant is connected to the grid via power line 675 delivering the station power to the nearest sub-station 700.

Figure 1A:
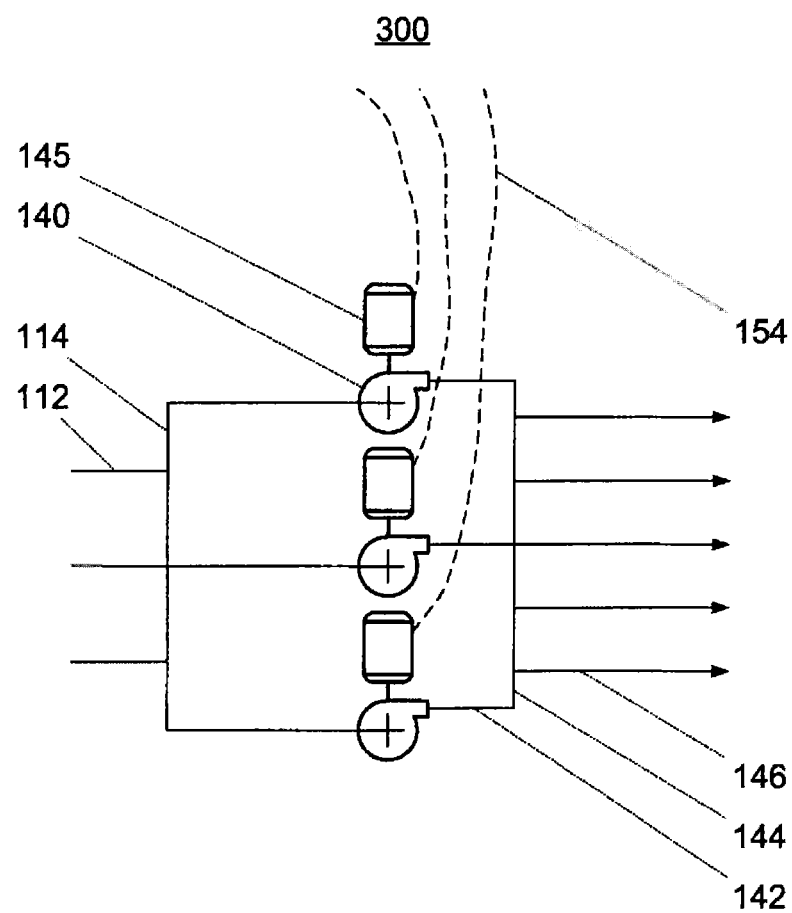
Figure 1B:
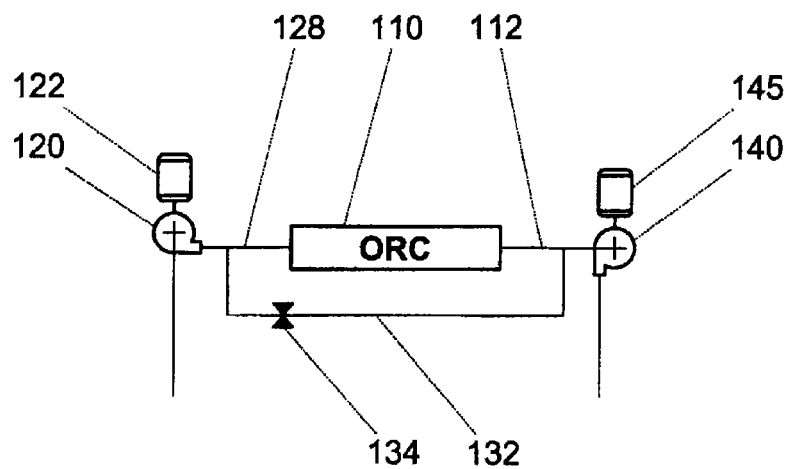
FIG. 1B is a diagram of a portion geothermal power plant, according to an embodiment of the present invention.

The production part 100 comprises one or more production pumps 120, powered usually by single speed electric motor 122 sitting on top of a production well 90. As production wells may be clogged or motors and pumps need maintenance, there are usually few wells in a production section 100. Wells are spread downstream of a moving water body of geothermal reservoir or away on one side of sitting aquifer. Injection pumps section 200 is upstream of a moving body of geothermal reservoir or on the other side of the geothermal field and the power conversion system 300 in the middle. Each well has its product line 124 connected to a common header 126 which geographically sits near to the power conversion section 200. The power conversion section 200 comprise at least one ORC power plant 110 fed by one or more production pumps 120 and one or more injection pumps 140 driven by motor 122 and 145 respectively, whose task is to dump the heat depleted fluid back into the aquifer by use of the pump exit line 142, a common header 144 and usually few injection lines 146 leading to injection wells 95. Generators of the Organic Rankine Cycle (ORC) power plants 110 are connected to power buss 640 via electric lines 58. The power buss 640 is connected and thus feeding the auxiliary buss panels 620 and 660 which feed the related pumps through power lines 150 and 154, FIG. 1B shows that in case a reduced power output is required for a few hours, and in case the production wells 120 and/or injection wells 140 are preferably operated at constant flow rate due to local well limitations, then line 132 is installed to by-pass the ORC power plant and supply controlled amount of hot brine by adjusting the bypass flow using control valve 134.

Figure 2:
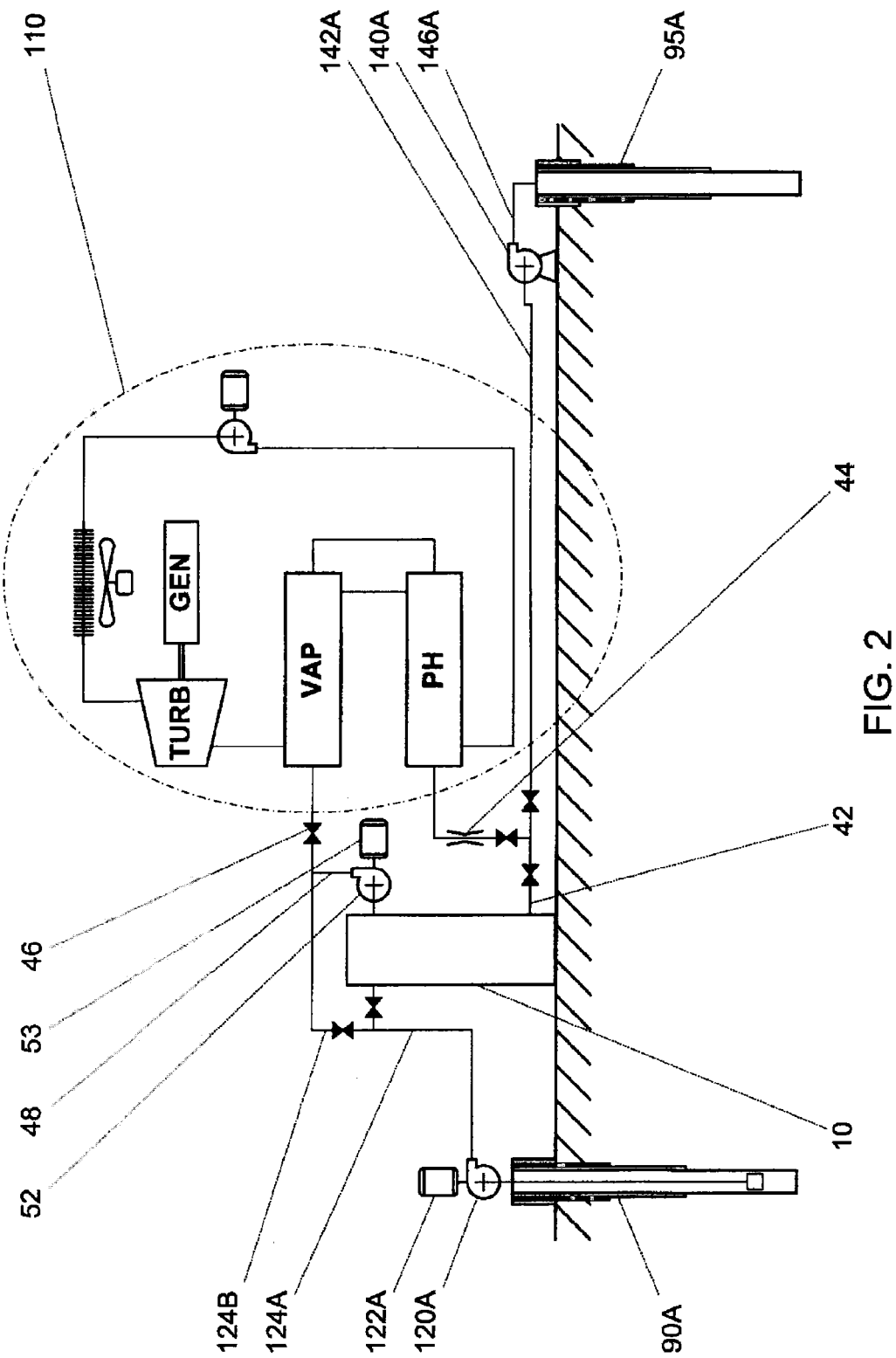
FIG. 2 is a diagram of a geothermal power plant, according to another embodiment of the present invention.
Figure 2:
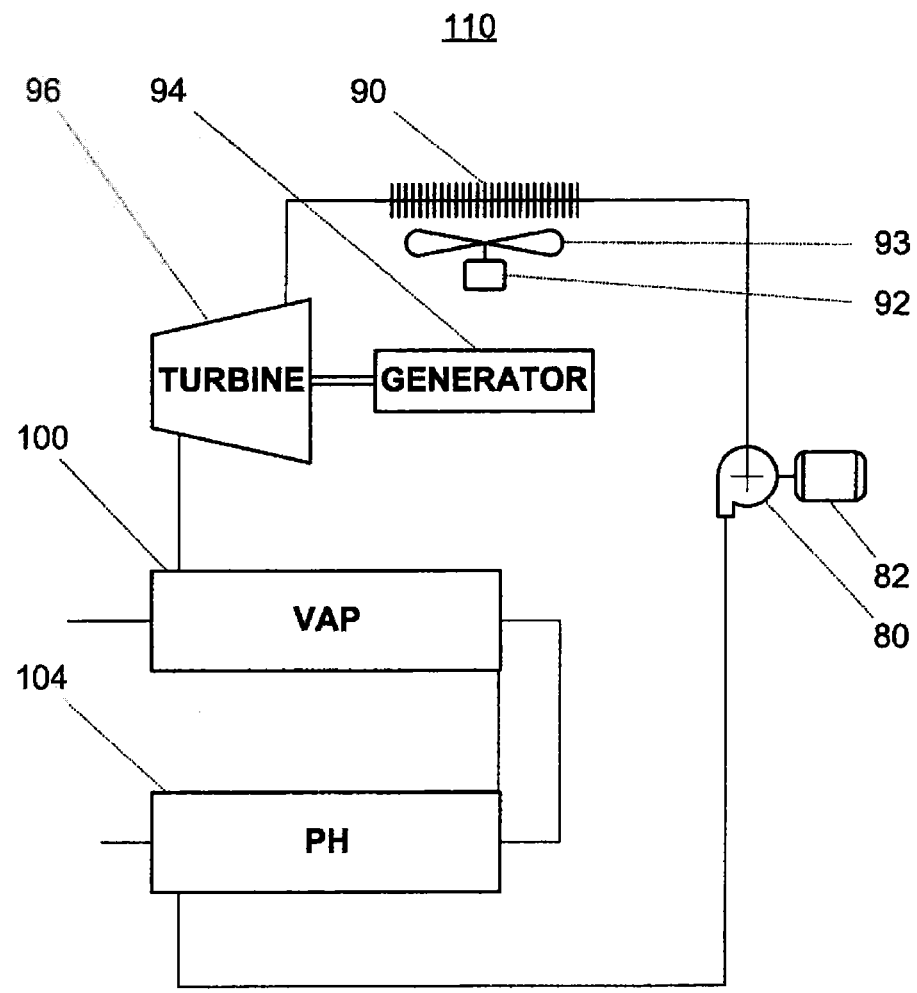

FIG. 2 presents the case in which electric power output is not continuously required and hot brine from production well 90A pumped by production pump 120A which is driven by motor 122A either flows directly to the ORC via lines 124A and 124B or when power is not required, into storage tank 10.

A usual basic design of geothermal ORC 110 comprises a heating path of an evaporator 100 and preheater 104 through a restriction 44 that keeps the evaporator and preheater always filled with liquid brine. The preheater 104 heats up the organic fluid near to the evaporation temperature and the evaporator 100 evaporate the fluid which expands in the turbine 96, turns the generator 94 and exits at lower pressure to the condenser 90. The condenser 90 can be either air cooled or water cooled. The condensate is circulated back to the pre heater 104 by the circulation pump 80 driven by its motor 82. The air cooled condenser 90 is cooled by a forced drafted air by use of fan 93 driven by motor 92. In case of low demand for power, power unit 110 may work on partial production or be completely stopped. The hot brine may then be sent to a storage pressure tank 10.

It is noted that tank 10 may represent array of tanks that have a total volume capacity that covers a desired time of storage for a certain size power station. An optional arrangement of pressurized storage tank is given in FIG. 2A. In regular mode of operation brine flows directly by line 124B to the evaporator 100 bypassing the storage tanks 10. During charging the incoming hot brine enters the storage tank 10 on top and line 124B is closed. The entering brine push out the heat depleted brine that filled the tanks since after the last use of the storage, through pipe 42. During discharging mode of the storage tanks 10, the brine flows into evaporator 100 and pre-heater 104 through line 48 and valve 46. Then it is circulated back to the storage tank 10 by auxiliary pump 52 sitting on line 53 that is parallel to line 42 and is closed during the discharge mode. If the power system 110 cannot work above its design power then during discharge mode, in order to maximize the power output, the injection pump 140A is switched off. The production well 120A even with zero flow rate is kept working to keep the high pressure in the storage tanks 10. With no flow the power requirement will be limited. Auxiliary pump 52 is relatively small as it only has to overcome the circulation friction losses. In case the power system 110 can produce power above its rated power then during the discharging mode additional brine can be added from production line 124A and the bypass 124E to be mixed with the stored brine and flow through the evaporator 100 and preheater 104 and thus increase the heat supply and cause enhanced evaporation and therefore higher power output. While part of the brine return to the storage tanks 10, the excess brine flows through pipeline 142A to the injection pump 140A and is dumped in injection well 95.

Figure 2A:
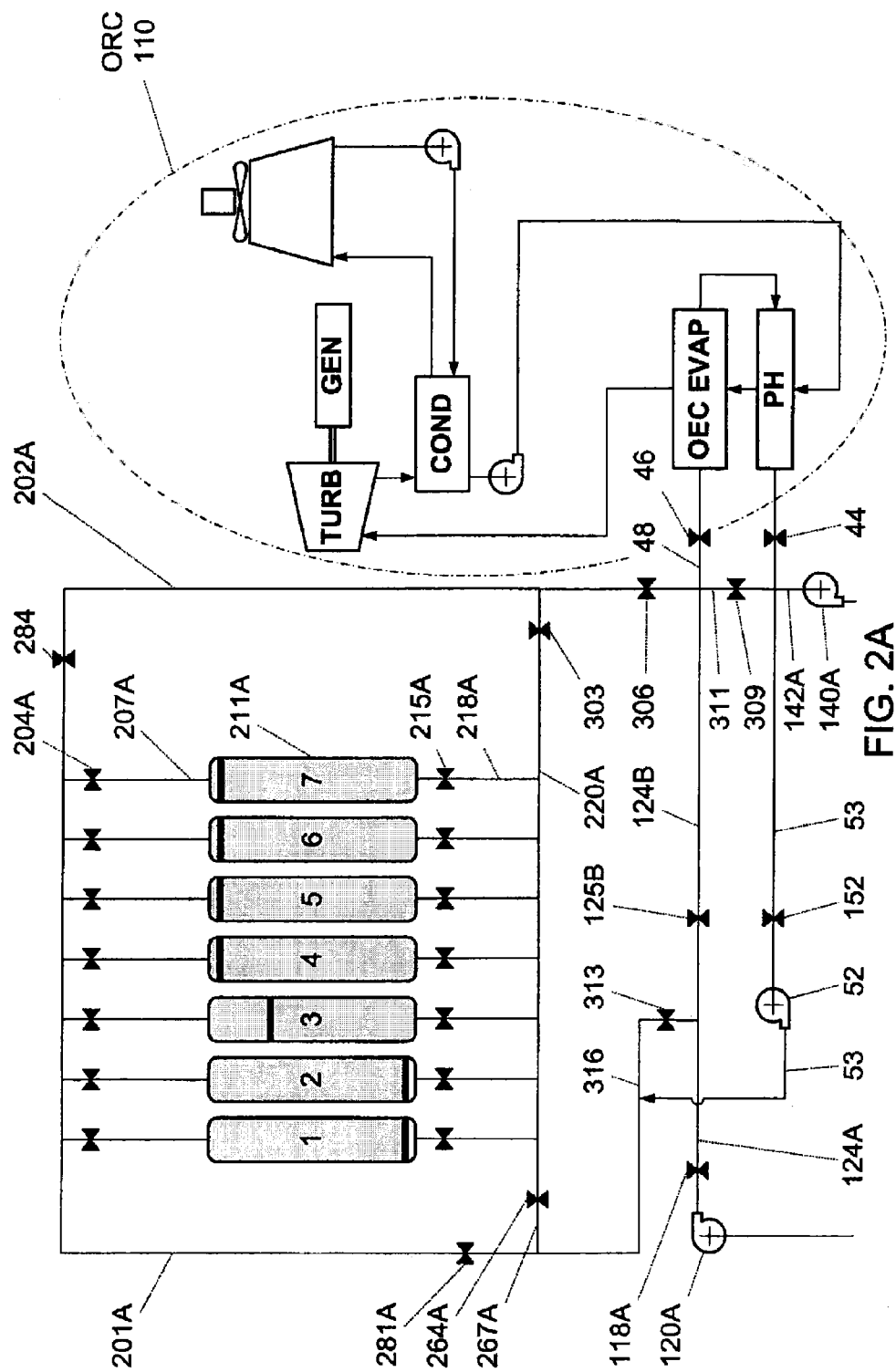
FIG. 2A is a diagram of a geothermal power plant, according to a further embodiment of the present invention.

An example of an embodiment of the optional arrangement using pressurized storage tanks is described with reference to FIG. 2A. In the example, 7 pressure tanks 211A make up storage tank 10 in FIG. 2. During normal operation, brine flows from production pump 120A through lines 124A, 124B and 48 to the evaporator 100 and preheater 104 of Organic Rankine Cycle power plant 110. Heat depleted brine exits power plant 110 via valve 44 and line 53 to the injection pump 140A via line 142A. During regular operation it is assumed that the storage tanks are filled with the heat depleted brine which is kept under pressure waiting for next charging mode. The pressure in the storage tanks is the production pump pressure which keeps NCG's in the stored brine thus minimizing corrosion which may occur. When power is in low demand Organic Rankine Cycle power plant 110 can be stopped and storage tanks 211A can be filled with hot brine. The filling is carried out by closing valves 124B and 264A and permitting the brine to flow through lines 316 to line 201A into one of the storage tanks 211A. During this charging process, Organic Rankine Cycle power plant 110 is isolated by closed valves 46 and 44. This is required since the brine that was in the storage tanks is forced out through lines 220A, 201A, 311 and 142A towards the injection pump 140A. Tanks are usually advantageously vertical and the same tank can contain both cold and hot brines, separated by thermocline natural separation zone. The liquids are separated by the different densities so that the hot brine flows above the cold brine and mixing can occur in the boarder surface between the two. Even if care is taken to reduce turbulence, the thermocline zone can slowly increase and a loss of heat can take place. In a further option separation plates can be used which may be designed to have a specific density that is between the density of the hot and cold brines. If such a plate is insulated, then the loss of heat may be reduced even if there is some flow or passage of brine at the rim of such a plate. It is advantageous to use vertical tanks when natural thermocline separation is utilized. However, horizontal tanks can also be used with mid-tank membrane separators or plate separators being employed in this tanks.

During discharge, injection pump 140A is switched off and production pump 120A continues operation to keep the whole system under high pressure with close to zero flow. Valves 44 and 46 and 267A and 284 are opened and valves 309, 281A and 303 are closed. Circulation pump 52 forces heat depleted brine from line 53 towards from line 220A and to the selected storage tank. Valves 215A and 207A of the selected tank 211A are opened. In the example described with reference to FIG. 2A, tanks 1 and 2 have already been used i.e. filled with heat depleted brine, tank 3 is at work and the rest are still full with hot brine. Hot brine is forced/pumped from the working tank to header 284 then to line 201A and to Organic Rankine Cycle power plant 110 through valve 46. The heat depleted brine exiting the power plant flows towards circulation pump 52. In the case where demand for power is high and Organic Rankine Cycle power plant 110 can operate above the rated capacity, there is a possibility to enhance power output by adding fresh brine to the already stored brine by mixing two streams in line 124B. The additional brine, after being used is separated from line 53 is injected by injection pump 140A. Careful analysis should be made to evaluate the advantage gained by mixing the brines requiring operation of both the production and injection pumps compared to the net unit power obtained when both pumps are switched off.

Figure 2B:
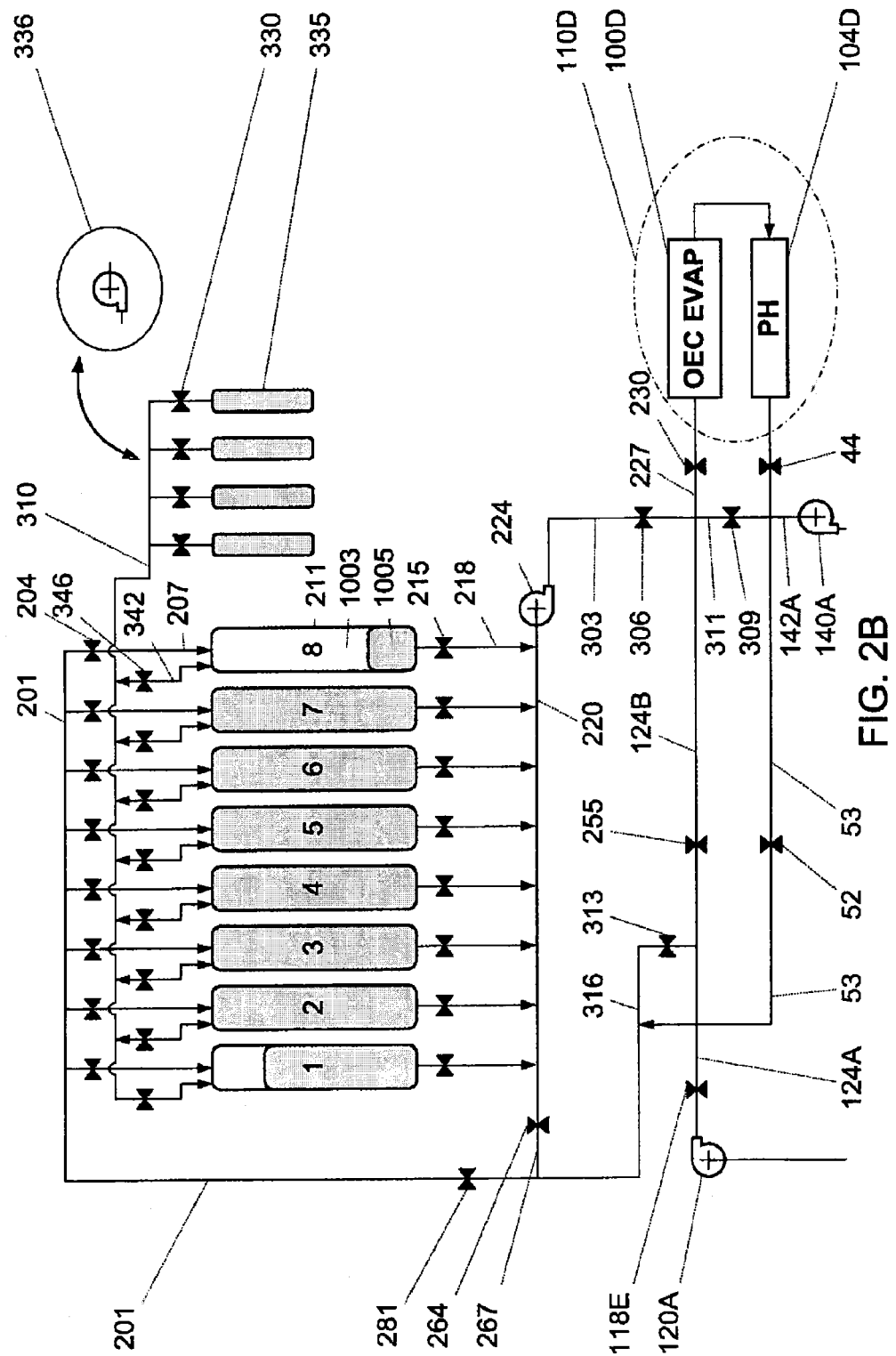
FIG. 2B is a diagram of a geothermal power plant, according to a still further embodiment of the present invention.

A further embodiment of an optional arrangement using pressurized storage tanks for use together with Organic Rankine Cycle power plant 110D is described with reference to FIG. 2B. Tanks 211 are similar to those described with reference to FIG. 2A but here the system requires an additional tank that is pressurized by inert gas that maintains the pressure above the equilibrium pressure and thus supports a noncorrosive environment. All tanks 211 have a gas inlet outlet pipe 342 and valve 345 in addition to main top inlet pipe 207. The gas pipeline 310 is maintained continuously under pressure by gas cylinders 335 connected by valves 330. Alternatively, a gas generator (not shown) and gas pump 336 can be used. For charging mode, it is assumed that the initial status is that all storage tanks 211 are filled with cold heat depleted brine. Tanks 211 can be vertical, or, alternatively horizontal with a slight inclination in order to facilitate the gas flow in and out of the tanks from their highest point. In addition, liquid can also enter from the top and be extracted from the lowest point at the bottom of the tanks.

During normal operation, the storage tanks are isolated. Valves 313, 306, 309 and 52 are closed and valves 118E, 255 44 and 230 are opened. Hot brine will flow from the production well using production pump 120A through line 124A, 124B, 227 to Organic Rankine Cycle Power plant 110D. The heat depleted brine after transferring its heat to the ORC motive fluid in the evaporator 100D and the pre-heater 104D, exits to line 142A to the injection well using injection pump 140A.

Before the next charging mode commences, all but one tank are filled with heat depleted brine. For example:—211/1-7. One tank is filled with inert gas—in this example tank 211/8. During the charging modes Organic Rankine Cycle Power plant 11D is shut down. Valves 255, 52 and 264 are closed and also all gas valves 345 and all tank inlet outlets 204, 215. The first tank to be filled is the one with inert gas, i.e. 211/8. When hot brine enters this tank, the gas is forced out through valve 345 of tank 8 which is open as is also valve 204/8 and assuming tank no 1 is the next in line, gas valve 345/1 must also be opened. Now, when brine enters tank 8 via line 124A, line 316, line 201 and line 207, valves 313 and 281 are opened and the gas is forced into tank 1. The gas entering tank 1 forces the brine content of tank 1 out through valve 215/1, line 218/1, line 220, via circulation pump 224, line 303, 311, 142A to injection pump 140A. Valves 306 and 309 are opened and valves 230 and 44 are closed. Now tank 1 is filled with gas and one can select any of the remaining tanks e.g. tank no. 2 to proceed. Tank 1 will be filled with brine and tank 2 will receive the gas and the procedure repeats itself until all but one tank be filled with hot brine, e.g. 7.

In the discharge mode, production pump 120A and injection pump 140A are switched off. Hot brine is advantageously extracted from the bottom of tanks 211 as there is no problem of mixing. Since tank 7 is filled with gas, the charging may start with any of the others e.g. tank 6. Brine valve 215/6 is opened, hot brine will flow through line 220 to the circulation pump, and via lines 303 and 227 into Organic Rankine Cycle power plant 110D. Heat depleted brine flows back through line 53, 201 to the top of the tanks and into the gas filled tank, here 211/7. This valving method can be repeated until all the hot stored brine is utilized so that the tanks will be filled with heat depleted brine except for one tank that will be filled with inert gas. Some (a relatively small amount) of the inert gas will be lost in the brine due to it being dissolved therein but this can be dealt with. During the discharge mode, valves 118E, 313, 255, 309, 264, and valves 204 and 215 are closed except for those under the tank that is empty of brine and the one that is filled with gas and will now be filled from the top by heat depleted brine.

In a further option, the system described with reference to FIG. 2B can be utilized without the gas system but instead using a vacuum pump for Non Condensable Gas (NCG) removal if allowed, and/or add a compressor to inject the NCG into the ground via the injection well if this is advantageous. The additional tank with reference to FIG. 2B is used to allow the separation between hot and cold fluids. In this option, vacuum should be modest. Vapor at equilibrium pressure will fill the empty space above the liquids in either the hot or "cold" tanks. NCG may get out of the brines and its removal is important for proper operation of the storage system.

Figure 3:
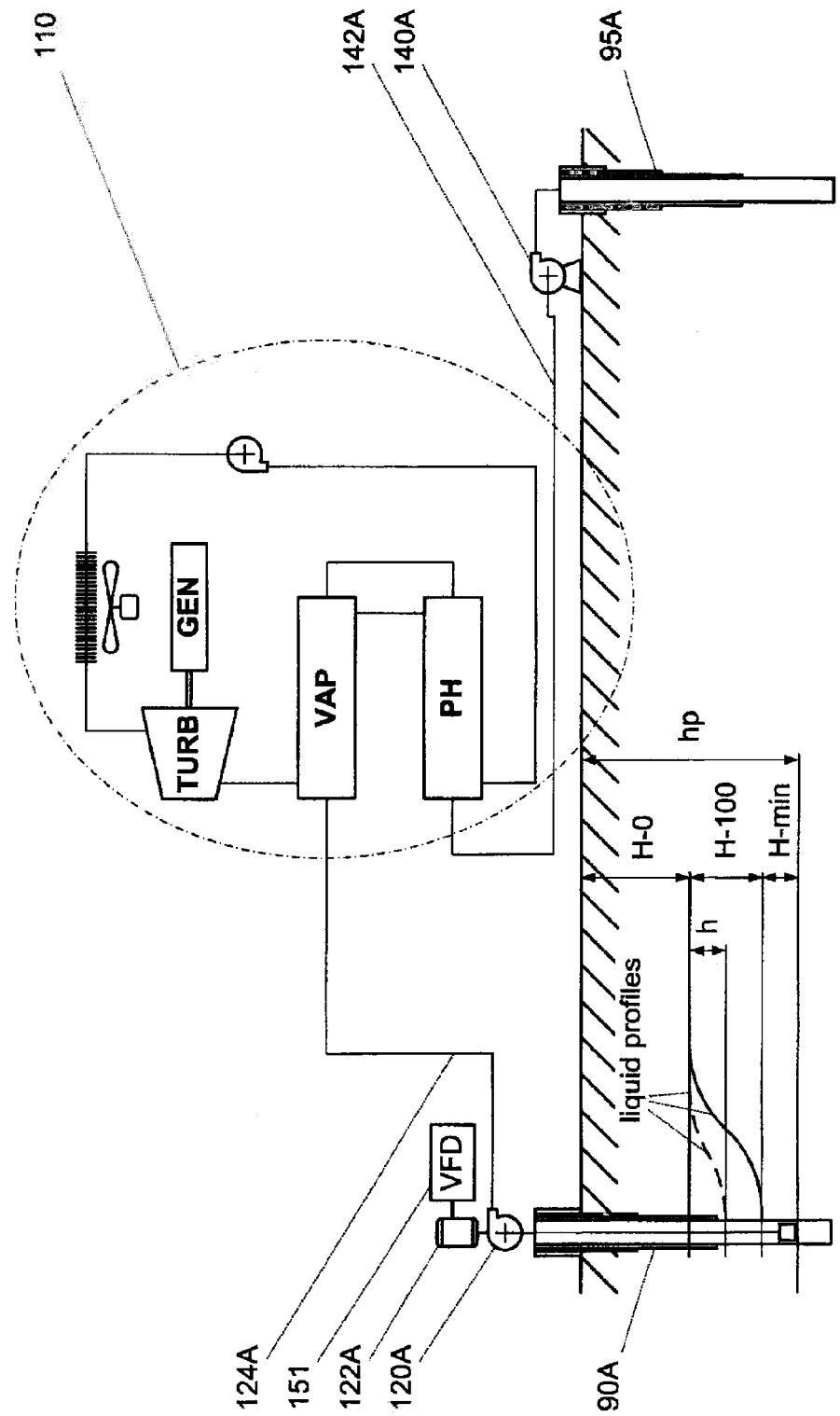
FIG. 3 is a diagram of a geothermal power plant, according to an even further embodiment of the present invention.

A further embodiment of the present invention relating to brine storage is described with reference to FIG. 3 and deals with the option of storing brine underground. A similar system is described in U.S. patent application Ser. No. 13/614,759. The present application incorporates by reference the entire disclosure of U.S. patent application Ser. No. 13/614,759, filed on Sep. 13, 2012. A typical geothermal ORC power plant 110 comprises a production well 90A in which the production pump 120A has its lower suction impeller lowered to level hp below the ground surface. The pump supplies the hot brine to ORC power plant using pipe 124A. The heat depleted brine then exits ORC power plant 110 through pipe 142A and is pumped back into the underground aquifer through injection well 95A by injection pump 140A. When energy demand is reduced, and the wells condition allows the brine flow to the ORC power plant is reduced by controlling pump 120A rotation speed by use of VFD (Variable Frequency Drive) 151 that controls the speed of motor 122A. Reduced flow of brine into ORC power plant 110 causes reduction in power production as desired. The reduced extraction of the brine by the pump allows the liquid level in the aquifer/reservoir to rise from level h-100 which was the position during 100% brine production to higher level h (see liquid level profiles). If the pumping will be completely stopped, then the level of water near the well will reach the aquifer liquid level that is marked as h-0. Level h-100 is selected as a limit (with some spare) that will assure enough height above the inlet of the lower impeller of pump 120A which is marked as h-min and is the allowed NPSH of the pump. This will assure that no cavitation occurs during pump operation. When demand for power is relayed from the grid control for increased energy demand, pump 120A will be switched on or the speed of the of VFD (Variable Frequency Drive) 151 increased and pump 120A causes increased flow of the brine and it will take about T hrs to reach an equilibrium again at level h-100.

This actually gives the size of storage of the aquifer-production well system:

$$V_{storage} = \text{Flowrate}_{100\%} \, T_{measure}[m3h*h=m3]$$

The underground flow rate towards the well depends on the rock porosity, layers arrangement and pressure head above the pump inlet. This means that the pumping rate may be increased above the rated flow for 100% production for a time limit that is smaller than the time T measured for 100% production. Since the target limit is set at h-100 and the time of operation until water level at the well will get from h-0 to h-100 is measurable, then it can be assumed that the time duration $T_{allowed}$ for over production of x % is $$T_{allowed} = \frac{100}{100 + X} T_{measured}$$

However, on the other hand, if a desired time for over production is known, then the amount of over production that is directly related to power production will be about:

$$V_{over\,production} - OverPower - 100\% \times \left(\frac{T_{measured}}{T_{desired}}\right)$$

This is an estimate because usually there are a few wells that serve a single ORC power plant and the injection wells can also influence the behavior of the production wells.

Figure 4:
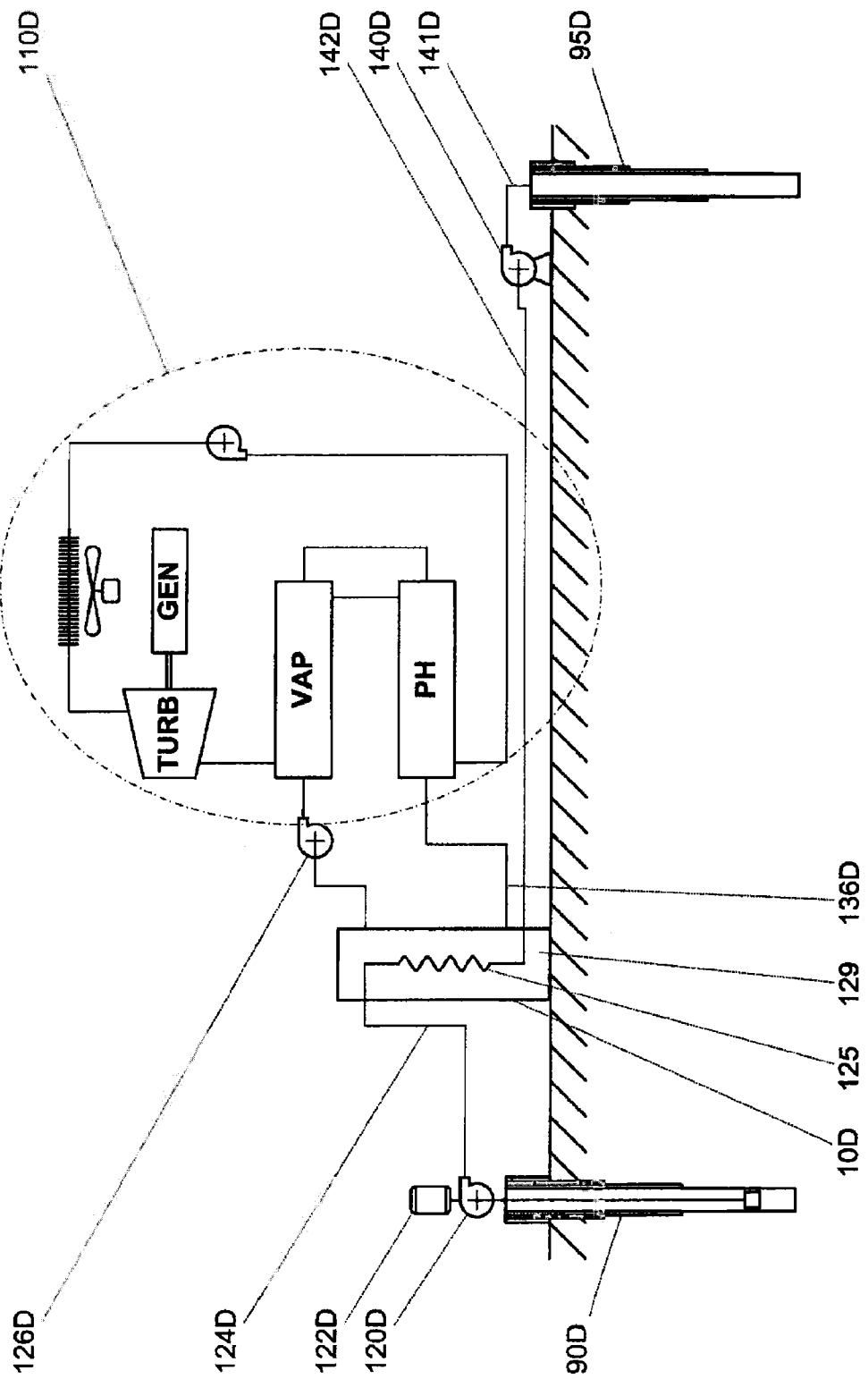
FIG. 4 is a diagram of a geothermal power plant, according to an additional embodiment of the present invention.

Turning to a further embodiment of the present invention described with reference to FIG. 4, an option in which the hot brine is not in contact with the ORC power plant 110D is described. Hot brine usually contains soluble and non-soluble materials originating from underground rocks and soil formations associated with the production well and aquifer which make it saline and often very corrosive. Such brine also contains non-condensable gases (NCG's) that should not be released to the atmosphere or ambient air, for that reason, the production pressure is usually maintained at a higher level than the temperature equilibrium pressure. In addition, precipitation of suspended materials can take place when brine is not flowing. Here, in order to overcome these issues a heat exchanger is used in which heat contained in the brine is transferred to treated water or thermal oil or any fluid that has suitable specific heat, thermal conductivity, viscosity, vapor pressure and thermal stability and is not corrosive.

In this embodiment, the brine is pumped from production well 90D by production pump 120D driven by motor 122D to heat exchanger 10D via conduit 124D. Advantageously, the brine flows in tubes 125 of heat exchanger 10D to permit cleaning if required. After transferring its heat to the heat transfer fluid 129, the brine flows to injection well 95D via conduit 142D by use of the injection pump. The heat transfer fluid 129 in heat exchanger 10D is circulated by cycle pump 126D through ORC power plant 110D where its heat is used and converted to useful power. The heat depleted heat transfer fluid flows back to the heat exchanger through line 136D. Heat exchanger 10D can be considered to represent an array of storage tanks that allows the storage of heat during low energy demand periods and the use of the stored heat to produce even more than the rated power during periods of high energy demand. A detailed explanation of such an arrangement is presented with reference to FIG. 4A. Another advantage achieved by the use of such a secondary fluid is that due to its purity or use of treated water, there is no need to use over pressure above the temperature equilibrium pressure. This significantly reduces the cost of the heat exchangers and storage tanks.

Figure 4A:
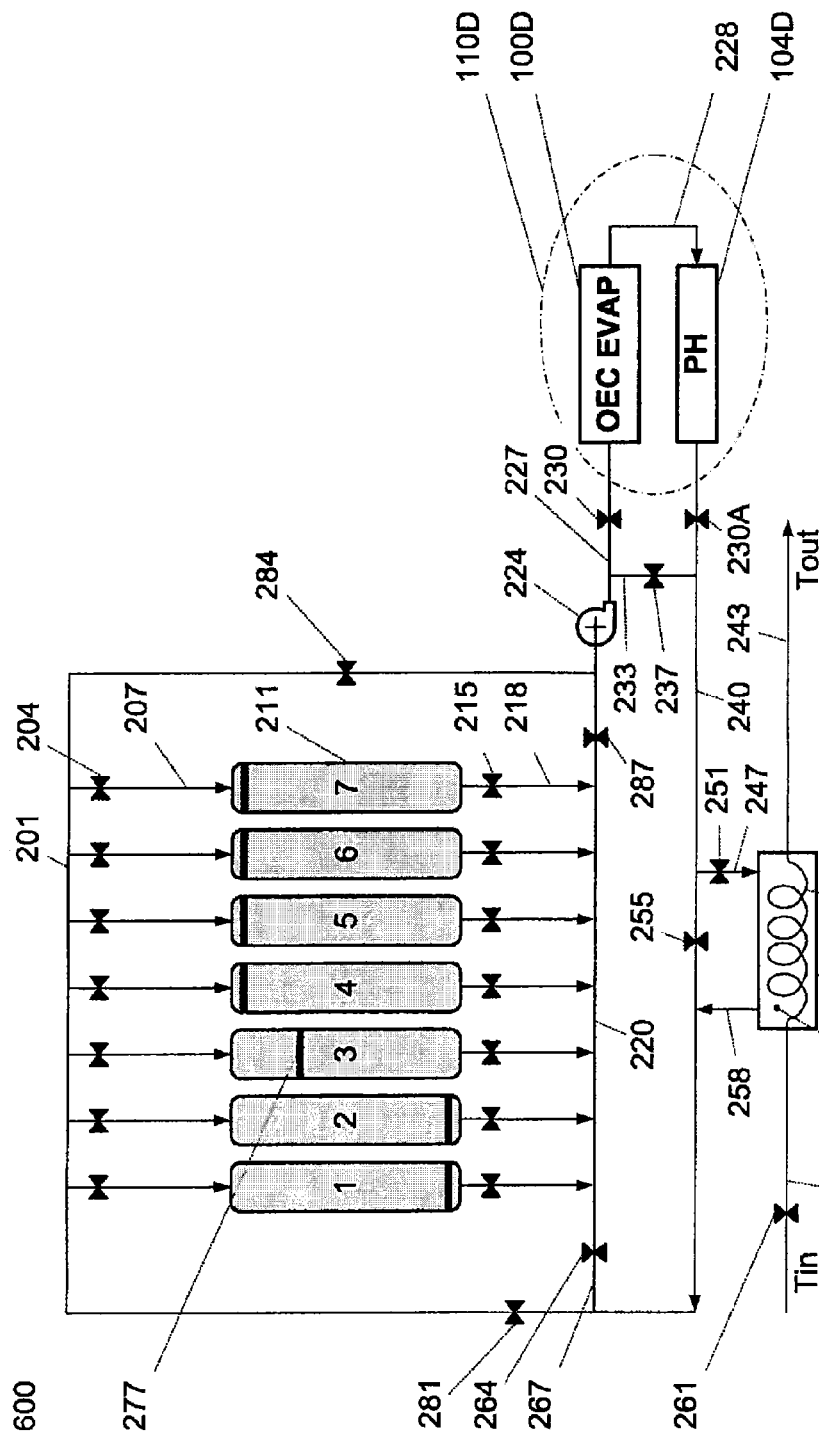
FIG. 4A is a diagram of a geothermal power plant, according to a still additional embodiment of the present invention.

An embodiment of an array of storage tanks is described with reference to FIG. 4A wherein an optional arrangement of closed cycle storage loop 600 is included. The method of its operation includes three modes of operation. The first mode is a direct continuous operation, the second mode comprises the charging the storage tanks 211 while the third mode is made up of discharging the storage tanks 211.

During continuous operation, the brine enters the main heat exchanger 10E via production line 124E which can advantageously flow inside the heat exchanger tubes to facilitate cleaning if required and easy handling of line 124E pressure. Its pressure is usually higher than the closed cycle pressure due to the thermal properties of heat transfer fluid used. The heat depleted brine exits via line 243 to the injection pump (not shown). Fluid 265 enters the heat exchanger from line 247 and exits in line 258. Valve 255 is closed and valve 281 is opened. The heated fluid flows through the peripheral line 201 into the bottom collecting header line 220 and circulation pump 224 pumps its to the ORC power plant 110D evaporator 100D and pre-heater 104D after which it flows back to the heat exchanger via lines 240 and 247. To maintain this circulation, valve 281 is closed, valve 264 is opened, valve 237 is closed and valve 230 is opened. During this mode the storage tanks 211 are all disconnected thus all valves 204 and 215 are closed. Referring to the charging mode, it has been assumed that initially all storage tanks 211 are filled with cold fluid whether treated water, thermal oil or other liquid. Tanks 211 are preferably vertical so that the same tank can be used for the cold and hot fluid and steps are taken to minimize the thermocline zone by maintaining very slow velocities at the inlet and outlet of the tanks. The difference in density between the hot and cold streams helps to maintain a small thermocline volume. To provide for a physical separation between cold and hot fluids a full size membrane could be used but this is not practical for the large tanks used in such systems. However, floating plates that have a mean density between the density of the cold and hot fluids can be used. Although there will not be a tight sealing between the two fluids, the size of thermocline zone volume will be much smaller in such a case.

A typical embodiment of the tank charging mode is described with reference to FIG. 4A. Tanks 211/1 and 211/2 are already filled with hot fluid. The separation plate density is higher than that of the hot fluid therefore the plate lies on the bottom of the tank. Tank no 211/3 is now being filled with hot fluid and the plate floats between the hot and cold fluids. Tanks 211/4-211/7 are still filled with cold fluid therefore the plates float on top of the liquid at the tanks head. Hot fluid always enters at the top of the tank via the top inlet and the cold fluid always enters and exits the tank at the bottom inlet of the tank. During charging mode, the ORC power plant is disconnected so that valves 230 are closed and valve 237 is open and valve 255 is closed. In the vicinity of storage tanks 211, valves 264 and 284 are closed and valves 287 and 281 are open. Valves 204 and 215 are closed except for the tank that is currently being charged. Circulation pump 224 pumps the cold fluid from tank 3 via collector line 220 to line 233 to heat exchanger 10E via line 247. Having been charged, the fluid exits from line 258 towards the header 201 and via line 207 to the tank that is currently active i.e. no 211/3 in the drawing. While the hot fluid enters from the top through valve 204/3 and line 207/3, the cold fluid exits from the bottom through valve 215/3 and line 218/3.

When energy is required, the stored hot fluid is pumped to evaporator 100D and pre-heater 104D of ORC power plant 110D. During this discharge mode, the hot fluid exits the storage tanks from above and the heat depleted fluid returns to the same tank from below. At the beginning of the discharge mode, all tanks 211 should be filled with hot fluid. If thermocline separators 277 are used, then they all are positioned at the bottom of the storage tanks as their specific gravity is a little higher than that of the hot fluid. If the thermocline is natural and maintained by density and calmness of flow, then the last few feet or meters of the thermocline zone may be lost and will not be used. Valves 237, 281, 287 and 251 are closed and valves 230, 255, 264 are opened. Also, the valves 204 and 215 of the tank that is currently working (211/3 in the drawing) are opened. The hot fluid is pumped from top of 211/3 via pipe 201 to evaporator 100D of ORC power plant 110D. From there, it is pumped via pipe 228 to the preheater and out via pipeline 240 to bypass 267 and back to the bottom of tank 211/3, forcing the hot fluid out. During the discharge mode both injection and production pumps are switched off so that the power output is higher than that of in regular operation.

Figure 4B:
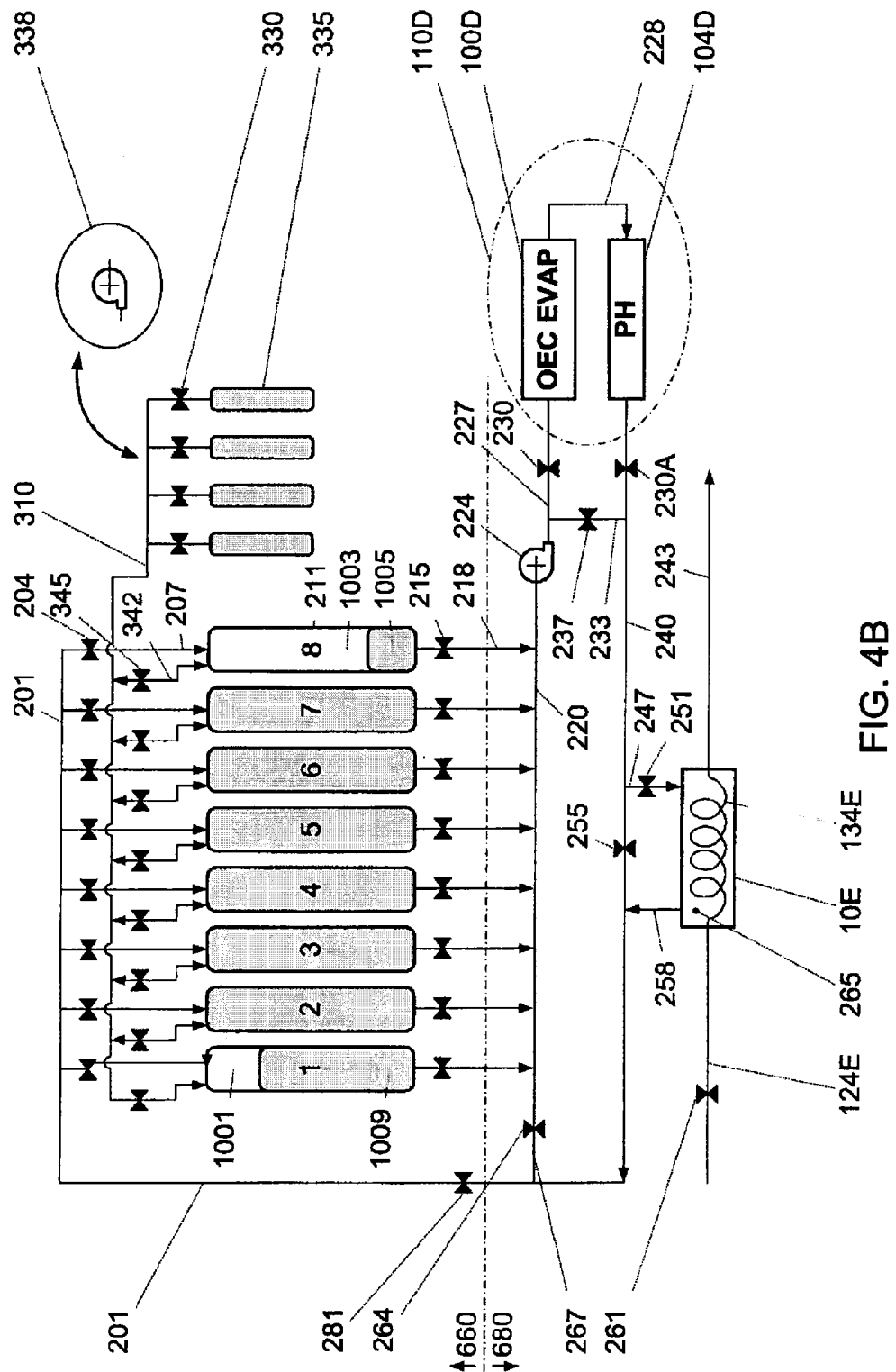
FIG. 4B is a diagram of a geothermal power plant, according to an added embodiment of the present invention.

A further embodiment of an arrangement of storage tanks, 660, serving ORC power plant 110D is described with reference to FIG. 4B. In this arrangement, a closed cycle loop of treated water or thermal oil other fluid is operated that receives its heat from the hot brine. In contrast to the storage system that is based on single tanks for both hot and cold fluids which suffer from loss of heat due to the thermocline zone, the present embodiment is based on a single storage tank system 211 that contain either hot fluid or cold fluids. This method is based on having an additional tank that is kept under pressure by inert gas that prevents the liquids from evaporating when filling only part of the tank volume. While the storage system 660 is similar to that of FIG. 2B, the lower portion 680 with the heat exchanger is similar to the system described with reference to FIG. 4A. The use of pressurized inert gas has an advantage in closed cycle systems compared to open cycle systems due to the use of the same fluid which means that loss of gas due to solubility in the fluid is a onetime event while in open systems as in FIG. 2B it is a repeated event in every charging cycle.

During regular operation, the brine enters the main heat exchanger 10E via production line 124E which can advantageously flow inside the heat exchanger tubes to facilitate cleaning if required and easy handling of line 124E pressure. Its pressure is usually higher than the closed cycle pressure due to the thermal properties of heat transfer fluid 265 used. The heat depleted brine exits via line 243 to the injection pump (not shown). Fluid 265 enters the heat exchanger from line 247 and exits in line 258. Valve 255 is closed and valve 281 is opened. The heated fluid flows through the peripheral line 201 into the bottom collecting header line 220 and circulation pump 224 pumps its to the ORC power plant 110D evaporator 100D and pre-heater 104D after which it flows back to the heat exchanger via lines 240 and 247. To maintain this circulation, valve 281 is closed, valve 264 is opened, valve 237 is closed and valve 230 and 230A are opened. During this mode the storage tanks 211 are all disconnected thus valves 204 and 215 and gas valves 345 are all closed.

Referring to the charging mode, it has been assumed that initially all storage tanks 211 are filled with cold fluid whether treated water, thermal oil or other liquid. Tanks 211 can be vertical but could also be horizontal with a slight inclination so that gas can flow in and out from the highest point of the tank. Liquid can also enter at the top of the tank and can be extracted from its lowest point at the bottom. In this embodiment, before the next charging mode commences all but one tank are filled with heat depleted brine. For example: 211/1-7. One tank is filled with inert gas—in this example tank 211/8 (in the figure it is shown that charging has already begun). During the charging mode, ORC power system 110D is shut down. Valves 255 and 264 are closed and so are all the gas valves 345 as well as all tank inlet and outlet valves 204, 215. Valve 237 is opened and both valves 230 and 230A at the inlet and outlet of the ORC power plant 110D are closed. The first tank to be filled is tank 211/8 containing the inert gas. When hot fluid enters this tank from the top, the gas is forced out through valve 345 of tank 8 which is open as is also 204/8 and assuming tank no. 211/1 is the next in line, gas valve 345/1 is also open. Now, when the fluid enters tank 8, the gas is forced to tank no 211/1. Gas entering tank 211/1 forces the fluid content of tank 211/1 out through valve 215/1, which is open and flows through line 218/1, line 220, via circulation pump 224, lines 227, 233, 240, 247 to heat exchanger 10E. Valve 281 is opened and valve 264 is closed. The charging started with fluid exiting the bottom of tank 211/1 and after it has been heated in the heat exchanger it flows to tank 211/8 while the gas from tank 211/8 is forced to enter tank 211/1. When all the fluid exists tank 211/1, valve 215/1 is closed and when tank 8 is completely filled with hot fluid both gas valve 345/8 and fluid valve 204/8 are closed. Consequently, at this time in the cycle, tank 211/1 is filled with gas, tank 8 is filled with hot fluid and the other tanks are filled with heat depleted fluid. One can select any of the remaining tanks to proceed. If tank 211/2 is selected, then its bottom valve 215/2 is opened and tank 211/1 will be filled from the top so that valve 204/1 is opened and both gas valves of tanks 211/1 and 211/2 are opened. Tank 211/1 is filled with fluid taken from tank 211/2 and tank 211/2 receives the gas from tank 211/1. This procedure repeats itself until all but one tank will be filled with hot brine e.g. no 211/7.

In the discharge mode, the production pump and injection pump are switched off. The hot brine can be extracted from the bottom of tanks 211 as there is no concern of mixing. So if no 211/7 is the gas filled tank, the charging may start with any of the others e.g. 211/6. Brine valve 215/6 is opened and hot brine will flow through line 220 via the circulation pump, lines 303 and 227 and to the ORC power plant 110D. The heat depleted brine flows back through lines 240 and 201 at the top of the tanks and into the gas filled tank, in this case, 211/7. During discharge mode, valves 237 and 251 are closed while valves 230 and 255 are opened. This valving method can be repeated again and again until all the stored hot brine is used. At the end of discharging, all but one tank will be filled by heat depleted fluid and one tank will remain with the pressurized inert gas and ready for the next cycle.

In a further option, the system described with reference to FIG. 4B can be utilized without the gas system but instead using a vacuum pump for Non Condensable Gas (NCG) removal if allowed, and/or add a compressor to inject the NCG into the ground via the injection well if this is advantageous. The additional tank with reference to FIG. 4B is used to allow the separation between hot and cold fluids. In this option, vacuum should be modest. Vapor at equilibrium pressure will fill the empty space above the liquids in either the hot or "cold" tanks. NCG may get out of the brines and its removal is important for proper operation of the storage system.

Figure 5A:
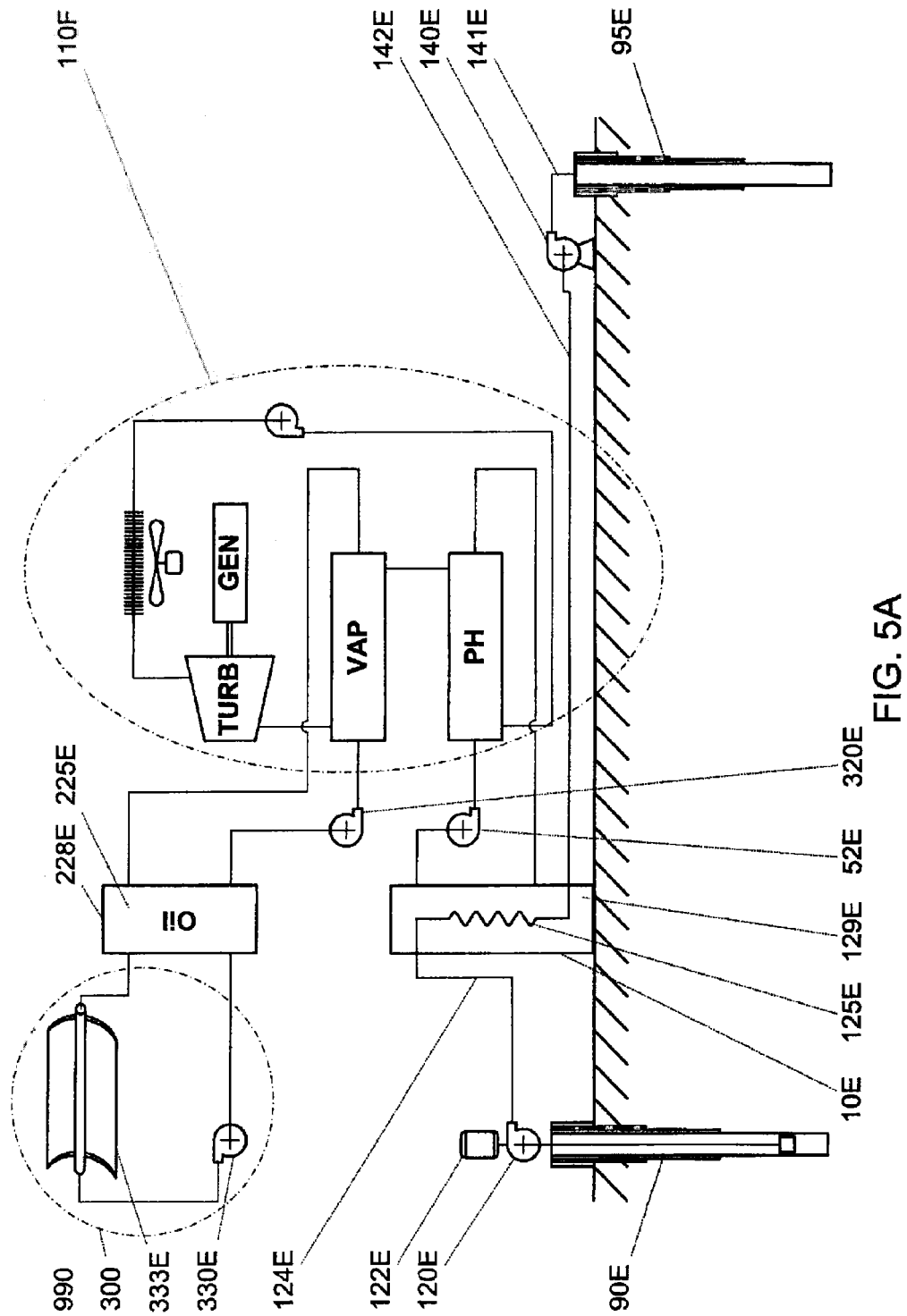
FIG. 5A is a diagram of a geothermal power plant, according to an additional added embodiment of the present invention.
Figure 5A:
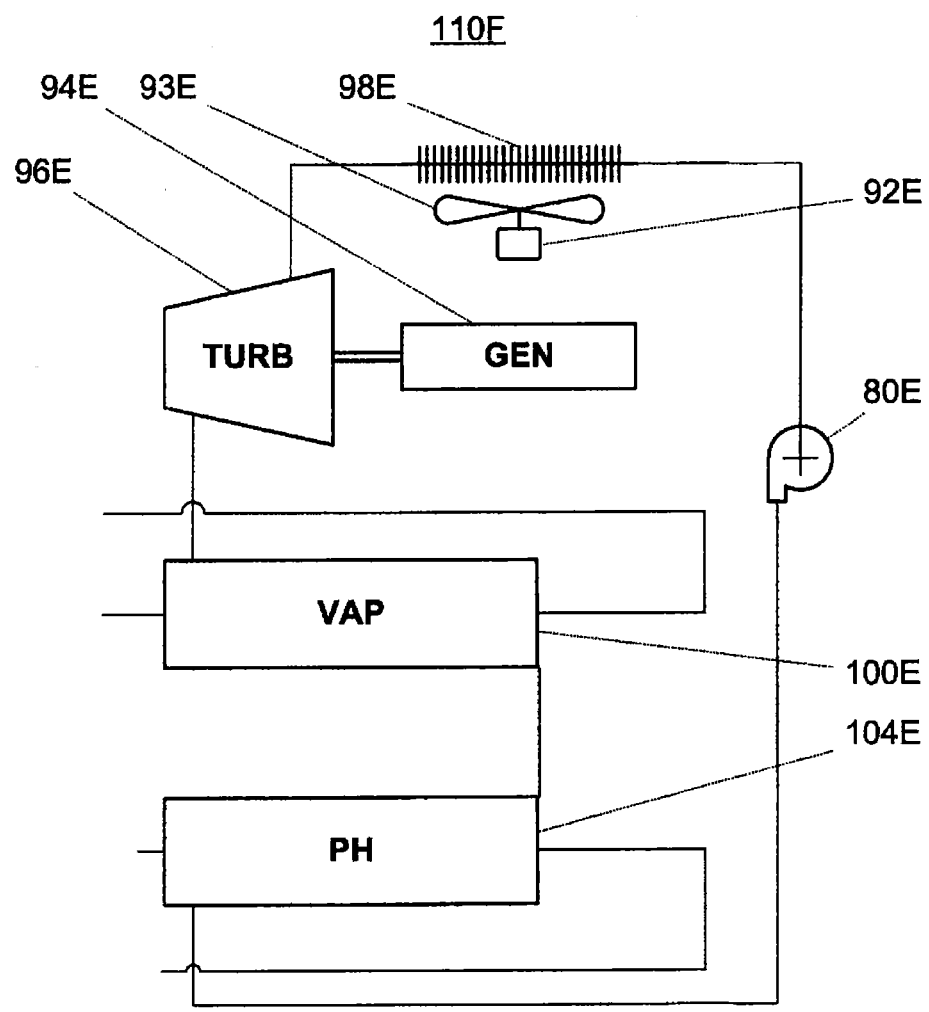

An additional embodiment of the present invention is described with reference to FIG. 5A wherein yet another method of storage for implementation in geothermal plant 990 is described. More specifically, the heat storage permits the ORC power plant system 110F to operate at desired periods of the day. The storage method is based on geothermal heated fluid 129E and solar heated fluid 225E. Geothermal heated fluid 129E can be treated water or any fluid that tolerates the temperature of geothermal brine and desirably not cause elevated pressures, have high heat transfer coefficients and cause no corrosion. The solar heated storage fluid 225E is preferably based on thermal oils since the oil can operate in both the solar system 300 as well as to transfer heat from the storage tank to ORC power system 110F. Similar storage systems are described in patent applications U.S. Ser. No. 12/621,899, filed Nov. 19, 2009, U.S. Ser. No. 12/624,063, filed Nov. 23, 2009, U.S. Ser. No. 13/474,375, filed May 17, 2012 and U.S. Ser. No. 14/029,599 Sep. 17, 2013, the present application incorporating by reference the entire disclosure of these U.S. patent applications.

Nevertheless, the solar heated storage fluid can be a different fluid, e.g. a heat transfer fluid, etc. provided it can serve both the heating loop and the temperature loss caused by the heat exchanger. Note that the system described here is a solar-assisted system, not a only solar system. Actually, the solar heating is designed to compensate for the heat loss in the heat exchanger 100E and add even a little more to thus permit the ORC power plant 110F to produce more power when designed to.

Since solar heated oil can be heated to temperatures higher than that of geothermal brine, the stored oil can be used for evaporation of the ORC 110F power plant working fluid in evaporator 100E with the heat provided by the geothermal brine being advantageously used for pre-heating in pre-heater 104E. Since solar systems operate during day time and geothermal systems work as base loads i.e. continuously, then for normal mode of operation the storage oil tank 228E must have a capacity to cover any desired operation periods required.

The solar unit 300 shown comprises desirably parabolic trough collectors 333E that can supply heat to above about 400° C. when used with water but limited when thermal oil is used. Then it's up to the designer to decide based on technical data and cost of the selected oil. Other solar systems can be used to supply the heat to the oil or other fluid, e.g. heat transfer fluid etc., like Fresnel concentrator, CSP tower etc. Similar solar-geothermal hybrid systems are described in patent applications U.S. Ser. No. 12/164,497 filed Jun. 30, 2008, U.S. Ser. No. 12/414,041, filed Mar. 30, 2009 and U.S. Ser. No. 13/731,714, filed Dec. 31, 2012, the present application incorporating by reference the entire disclosure of these U.S. patent applications.

It is advantageously assumed that the solar storage tank 228E can supply hot oil for 24 hours operation. For the solar side, pump 330E operates during day time when the solar system charges the oil storage tank and heat, at the same time, can be extracted whereas, as mentioned above, when charging is stopped, enough hot oil is present for operation in predefined operation period.

During normal operation, brine production-pump 120E, positioned deep in production well 90E, and operated by motor 122E supplies the geothermal brine via line 124E to storage/heat exchanger tank 10E and heat is transferred using heat exchange piping 125E to the closed cycle fluid 129E which preferably is treated water or other suitable fluids as described with reference to FIGS. 4, 4A, 4B. The heat depleted brine exits via line 142E and injection pump 140E pumps it into injection well 95E via line 141E.

Stored fluid 129E is circulated by circulation pump 52E through pre-heater 104E of ORC power plant 110F and at the same time the hot oil is circulated by circulation pump 320E through evaporator 100E of the ORC power plant 110F. ORC Power plant system 110F comprises at least the following items: pre-heater 104E, evaporator 100E, turbine 96E, electric generator 94E, condenser 98E cooled by e.g. air supplied by fan 93E powered by motor 92E and cycle pump 80E.

Heat exchanger 10E can be a single tank item during normal operation or can represent a heat exchanger and multi tank storage system in case power is not needed during a specific period of time and be needed (even more than design power) during other period of time of the day. Therefore, the time when the power unit is down may be used for charging a storage system which will be used in various methods of operation during discharge. Refer to the description referring to FIGS. 4A and 4B for the option of operation of the storage system for a closed cycle system.

Tank 228E also can represent an array of tanks. Because of relative low vapor pressure of thermal oil, the thermal oil does not have to be maintained under pressure so the tanks can be covered by light covers and low pressures can be used to protect against oxidation. For such thermal oils, a two tank arrangement 300E is most suitable, but any other method can be used. In solar unit 333E, circulation pump 330E supplies cold oil from tank 228E-1 to the solar collectors or concentrators and delivers the hot oil to tank 228E-2. During discharge, the hot oil is supplied from hot tank 228E-2 to ORC power plant 110E and is returned to cold tank 228E-1. In addition, during the discharge mode, production pump 120E and injection pump 140E are switched off, thus increasing the net power output of ORC power plant 110F.

A still further embodiment of the present invention is described with reference to FIG. 5B wherein an additional method of the solar supplement heating. In plant 990G, solar heating system 300G has two interface components with ORC power plant 110G, water heat exchanger 365G and organic motive fluid superheater/heat exchanger 370G. Both these items are used with ORC power plant or system 110G in a way that allows operation of ORC power plant 110G regardless of the operation of solar system 300G. When solar unit 300G is not in operation, the system operates in a manner similar to that described with reference to FIG. 4. When, however, solar system 300G is in operation, the hot stored oil is pumped by oil circulation pump 320G to the ORC super heater heat exchanger 370G and then, or in parallel, to the brine supplementary heater 365G designed to bring the temperature of stored water 129G in heat exchanger 10G to the design temperature of the ORC power plant heated directly by the production line brine and optionally superheat the organic vapor when possible.

Apart from the points of interface between the solar system 300G and ORC power system 110G, the storage method and storage operation of liquid 129G heated by the geothermal brine is similar to the storage method of operation described with reference to FIGS. 4A and 4B. The method of storage and operation of the thermal oil 225G heated by the solar system is also similar to that described with reference to FIG. 5A.

Figure 6:
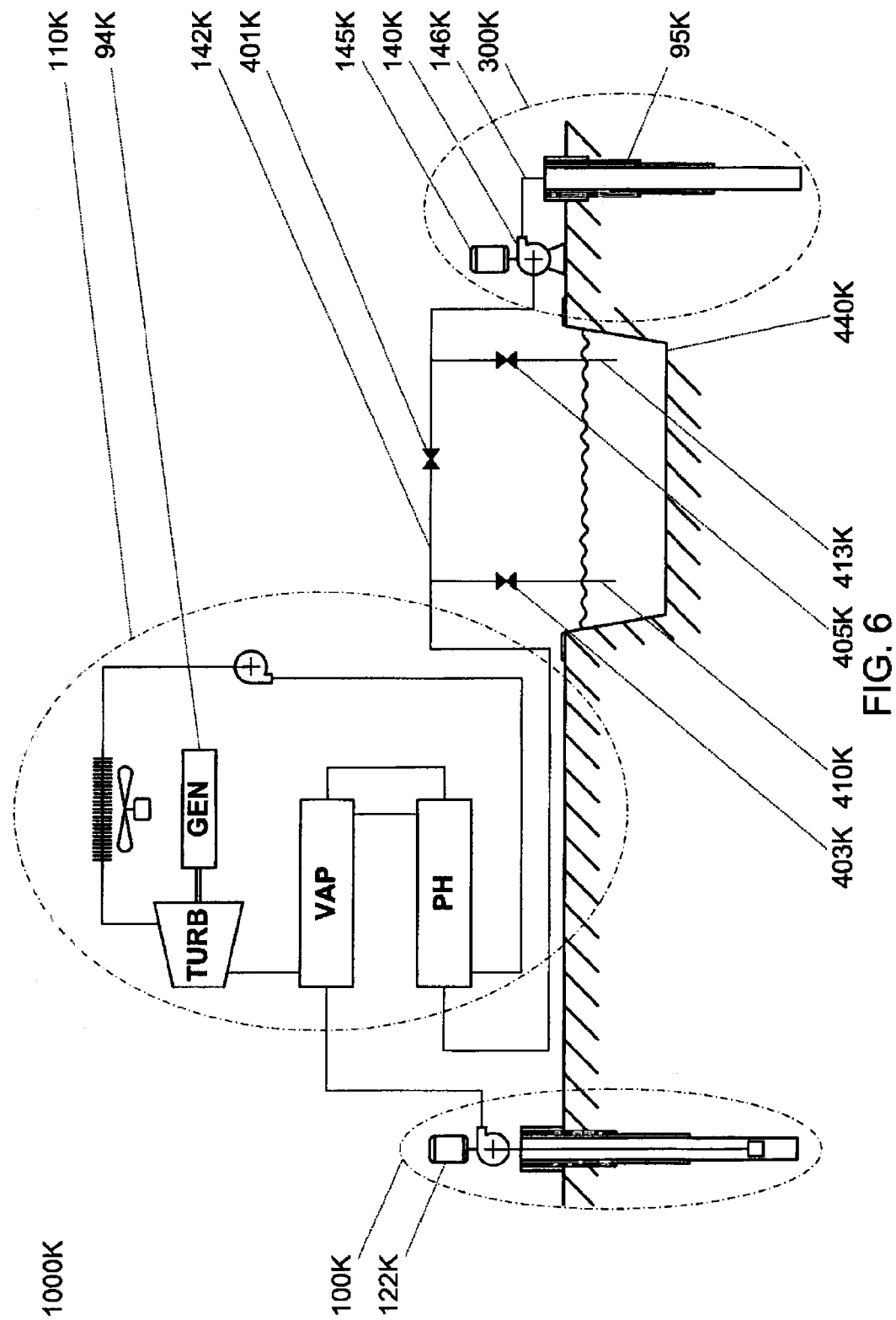
FIG. 6 is a diagram of a geothermal power plant, according to an even further embodiment of the present invention.
Figure 6A:
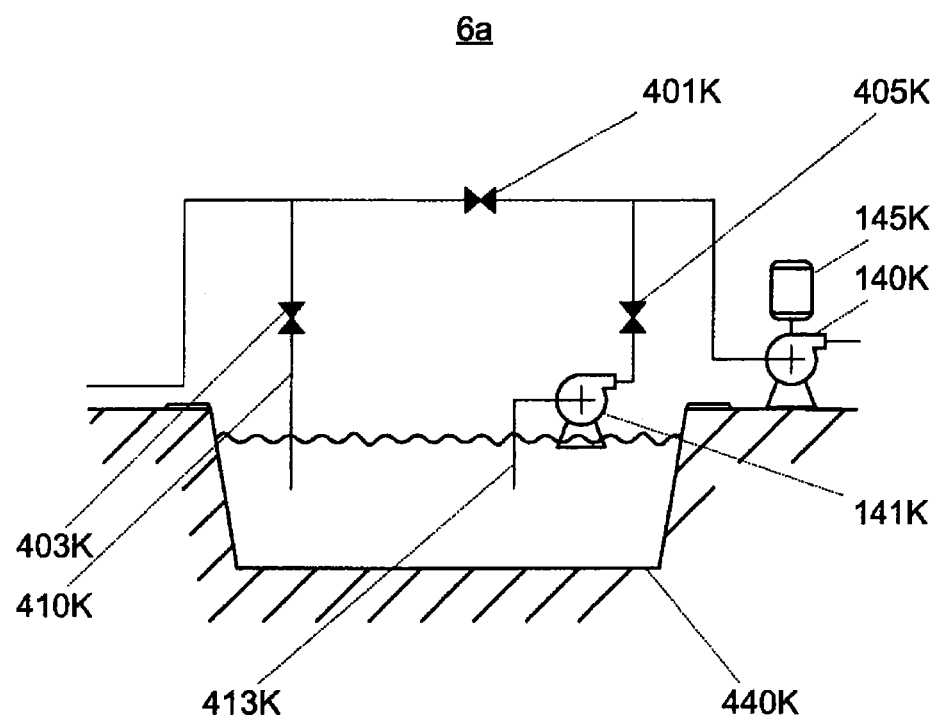
FIG. 6a is a diagram of a portion of the geothermal power plant, according to the embodiment of the present invention described with reference to FIG. 6.

Turning to a further embodiment of the present invention described with reference to FIG. 6, geothermal power system 1000K, a similar system having already been described with reference to FIG. 1, comprises brine production section 100K, power conversion section 110K and injection of heat depleted brine section 300K. In all previously described embodiments herein various methods of upstream energy storage between the brine production section and the power conversion section were described. In each of these embodiments, when heat depleted brine was supplied to the injection section, the injection pump is powered by a motor and its power requirement thus reduces the power output of power conversion section electric generator. The embodiment described with reference to FIG. 6 describes a method of downstream brine storage between power conversion section 110K and injection section 300K. This permits an increase in the net power output in the desired periods of time by the amount of energy saved by not operating the injection pumps 140K. The method of downstream storage requires the use of interim pond or atmospheric tanks 440K to which the heat depleted brine is supplied rather than being supplied to the injection section 300K. Line 142K is equipped with valve 401K and two additional lines are used, one ahead of the valve, line 410K that includes valve 403K and suction line 413K that includes valve 405K. During normal operation, valve 401K is opened and valves 403K and 405K are closed and the heat depleted brine is injected by pump 140K into injection well 95K. When the control operator orders brine injection pump 140K to stop, valve 401K is closed and valve 403K is opened. Pump motor 145K is stopped and the heat depleted brine is thus stored in storage means 440K whether it is an open pit or an atmospheric storage tank(s). The power saved during this action is the energy needed to operate motor 145K of pump 140K. Nevertheless, there is a power loss during the time of releasing the brine to the atmospheric storage or pit 440K. The brine line pressure drops from about 10-12 bars to one bar and this can be considered as an energy loss. During a low power demand period, injection pump 140K can be reactivated, valve 403K is closed and valve 405K is opened and injection pump 140K pumps out the brine from pit 440K through line 413K into the injection well 95K. Originally injection pump 140K only boosts the pressure from the line 142K pressure to the required injection pressure in line 146K. However, since the pressure in the pit 440K is atmospheric pressure, the pump must be replaced with a higher pressure ratio pump or additional pump can be added on line 413K to recover the lost pressure as shown in FIG. 6A.

Figure 7:
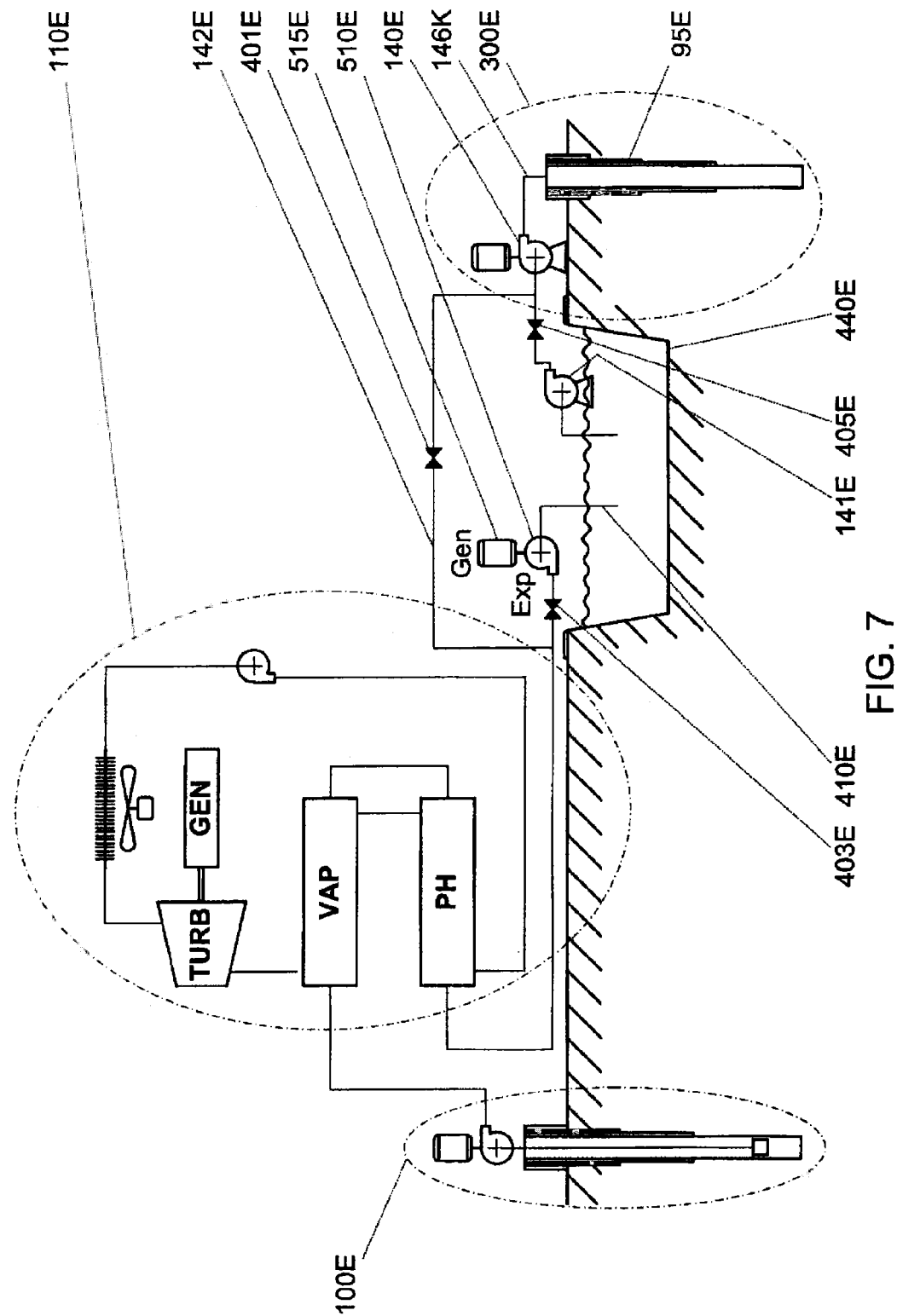
FIG. 7 is a diagram of a geothermal power plant, according to an even further additional embodiment of the present invention.

In the embodiment of the present invention described with reference to FIG. 7, a similar system to that described with reference to FIG. 6 including similar components except for the option of permitting the heat-depleted brine in line 142K to expand to about atmospheric pressure through hydraulic expander 510E or turbine instead of the simple valve used in the embodiment described with reference to FIG. 6.

During regular mode of operation, the production system 100E supplies hot brine to power unit 110E. The heat depleted brine exits the ORC power plant 110E by line 142E and flows towards injection system 300E. In regular mode of operation, the downstream storage system is bypassed as valves 403E and 405E are closed and valve 401E is opened. When a signal is given to stop injection pump 140E thus saving pump motor 145G energy, valve 401E is closed and valve 403E is opened. The brine flows into the storage pit 440E through valve 403E hydraulic expander 510E. Electric generator 514E run by hydraulic expander 510E will therefore recover the pressure energy of the heat-depleted brine. Later, when permitted, injection pre-pump 141E and injection pump 140E will be reactivated to empty the stored brine into the injection well 95E. Pre-pump 141E increases the pressure of the heat-depleted brine in pit 440E to the line pressure Timing is important since the recovered energy is produced at the same time that injection pump 140E is stopped so that the net power to the grid is increased by the sum of the injection pump energy and the recovered energy. Later, when the brine is pumped out by primary pump or pre-pump 141E and main injection pump 140E, the gained energy produced by the hydraulic expander can be considered as being consumed by pre-pump 141E. However, the operation of pre-pump 141E usually takes place during periods of low price electricity while the above-mentioned gain usually takes place during periods of high priced electricity.

Figure 7A:
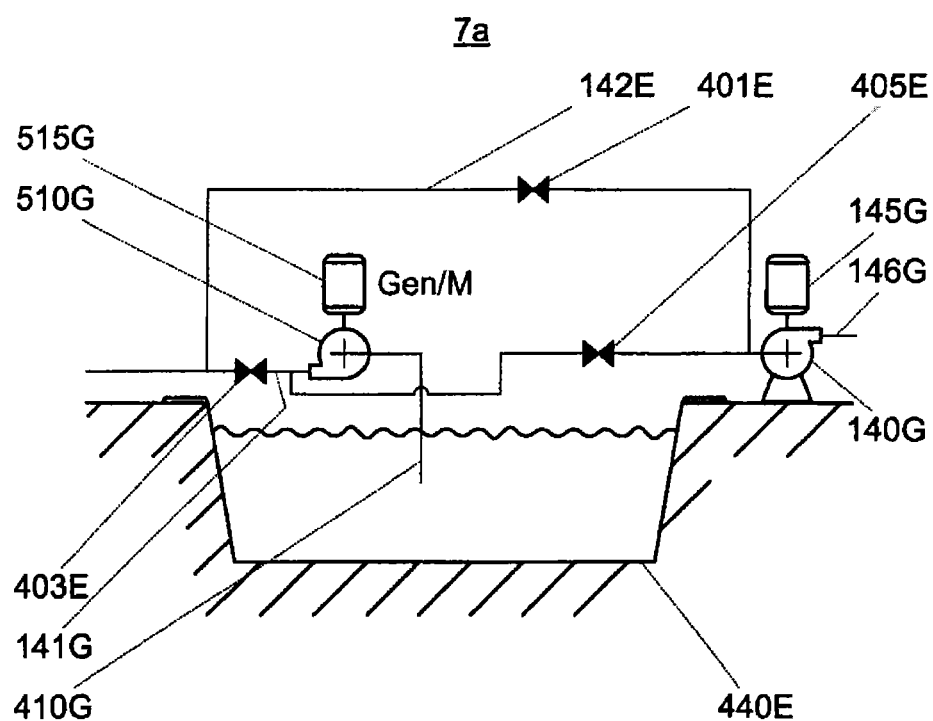
FIG. 7a is a diagram of a portion of a geothermal power plant, related to the embodiment of the present invention described with reference to FIG. 7.
Figure 7B:
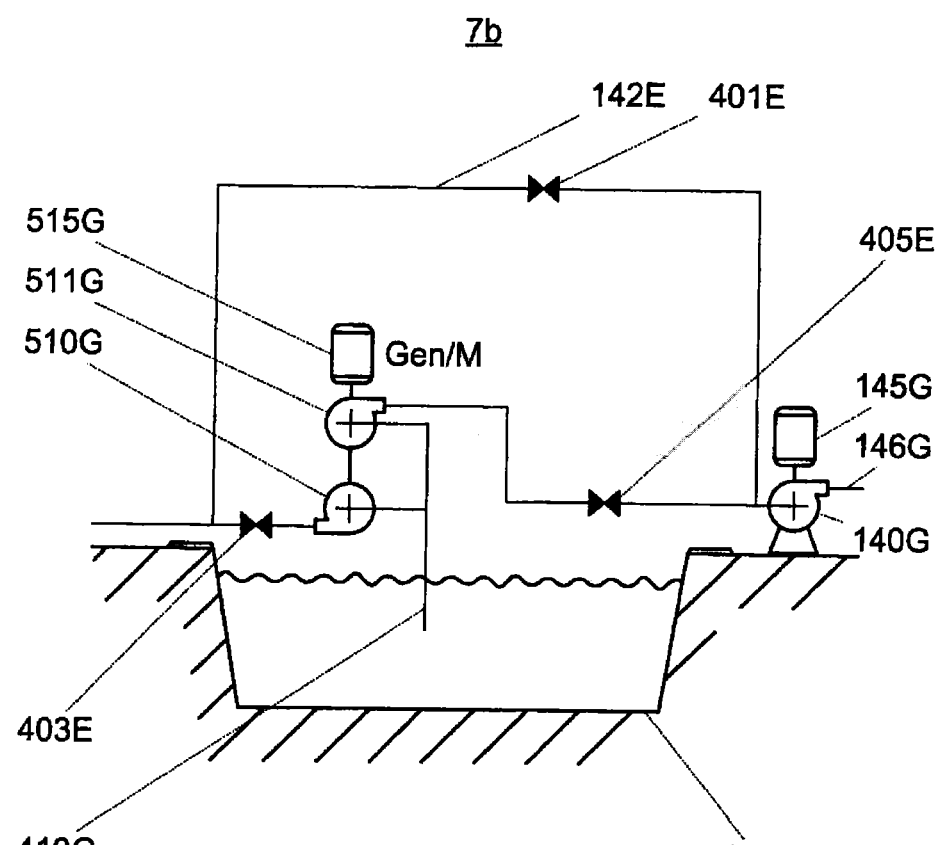
FIG. 7b is a diagram of an embodiment of a portion of a geothermal power plant, related to the embodiment of the present invention described with reference to FIG. 7.

As is found in pumped storage facilities, according to an embodiment of the present invention, the same machine can operate as a turbine and electric generator and in second mode as a motor and pump. Such an embodiment is described with reference to FIG. 7a whereby such a method that can save cost of hardware and installation. During regular operation the heat-depleted brine flows through by-pass line 142E to the injection pump 140G and injection line 146G into the injection well. Valve 401E is opened while valves 403E and 405E are closed. When the injection pump is stopped, the brine is released into the pit or storage tank 440E via hydraulic expander or turbine 510G and the generated energy produced by generator/motor 515G is sent to the main power plant power board. During this mode of operation, valve 401E is closed and valve 403E is opened. Brine flows via line 141G and hydraulic expander 510G and to the pit via line 410G. To empty storage or pit 440E, pipe 410G becomes the suction line and the hydraulic expander now operates as a pump driven by generator/motor 515G now acting as a motor. Valve 403E is closed and valve 405E is opened allowing the brine to flow towards the injection pump 140G and injection line 146G into the injection well. In some cases, depending on pressure ratio and flow rate, the efficiency of a counter rotating machine (hydraulic expander/pump mentioned above is not sufficient and instead of using the same machine as a hydraulic expander and pump, a dedicated machine can be used for either task but advantageously positioned on the same shaft with a single generator/motor used for both tasks. In FIG. 7b, a single generator/motor 515G is shown operating on the same shaft with hydraulic expander 510G and pump 511G.

Figure 8:
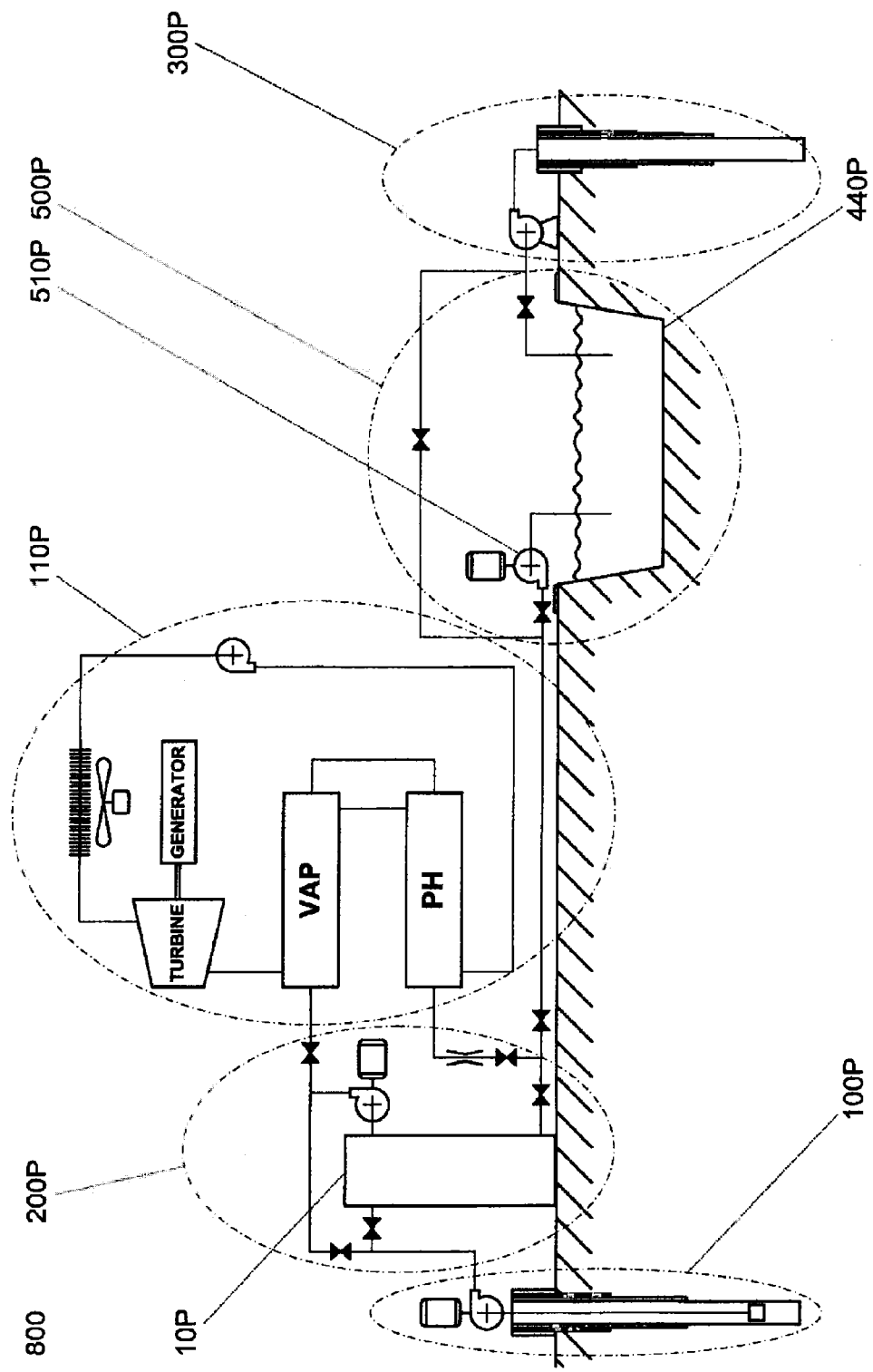
FIG. 8 is a diagram of a geothermal power plant, according to an added even further additional embodiment of the present invention.

A further embodiment of the present invention is described with reference to FIG. 8. Here system 800 comprises three main elements which are the production section 100P, the power conversion section 110P and the injection section 300P. There are additional two interface and storage sections 200P and 500P which combine the power conversion unit 110P to the production 100P on the one side and injection section 300P on the other side. During normal operation the interface sections are by-passed and during time of storage and or power saving both interfaces can be adopted separately or together in any combination desired. The particular combination presented in FIG. 8 shows the general case of hot brine storage in storage tank 10 and heat depleted brine storage in a pit or atmospheric tank 440P. The presented case is also the one showing that there is an energy recovery turbo-expander 510P before releasing the brine into the storage tank or pit 440P. The upfront storage and the downstream storage presented are merely given as examples for any other of the options already described with reference to FIGS. 2-7 above.

Figure 9:
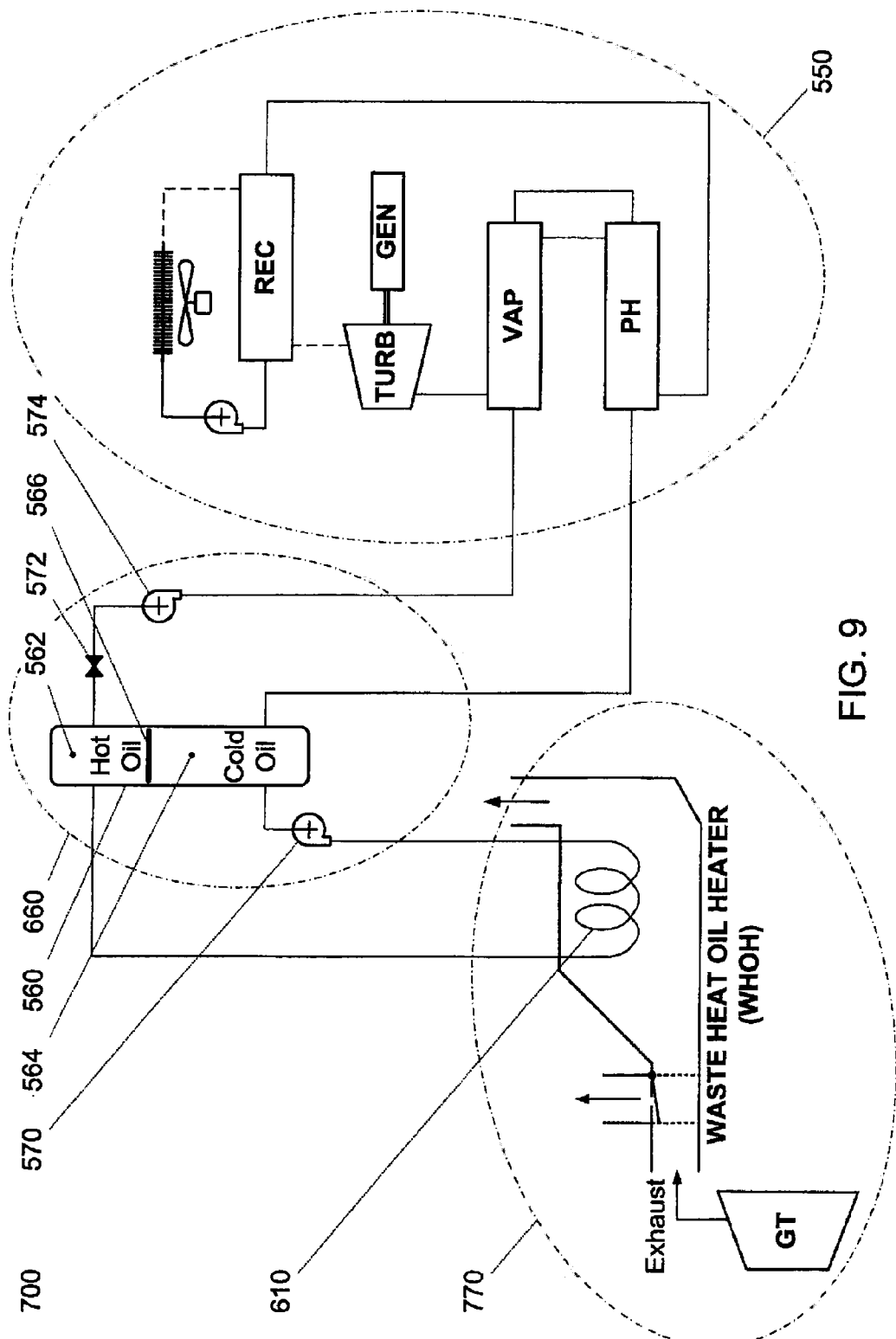
FIG. 9 is a diagram of a geothermal power plant, according to a still further additional embodiment of the present invention.

An additional embodiment of the present invention is described with reference to FIG. 9 including heat recovery system 700 so that an further option for thermal energy storage and additional option for power curtailment during selected period of time and an option for over production during other periods of time is provided. Although a gas turbine combined cycle 770 is given here as an example, any other source of waste heat can be used. In regular operation, the heat source continually heats up thermal oil in heat exchanger 610. During normal operation the oil flows directly to ORC power conversion unit 550. When power unit 550 is working in partial load then the unused heat can be sent to the storage system 660 where it will be stored for later use. When power from the ORC power plant is not required at all then the power unit 550 is stopped and the heated oil is accumulated and stored in the storage tank 560. Then, in later time when power is demanded and in accordance with the amount of energy required, the stored oil can be circulated and operate the power unit 550 at desired power rate. If more power is required and CC plant is in operation there is an option to add heat in parallel from the heat exchanger 610 to the circulating oil and the storage 560 and pump more oil to the power unit as allowed, therefore sending more heat into the power unit 550 according to its specifications. As in the previous case of thermal oil storage, there is the option of single tanks in thermocline arrangement or two tanks one for hot and one for cold oil.

Figure 10:
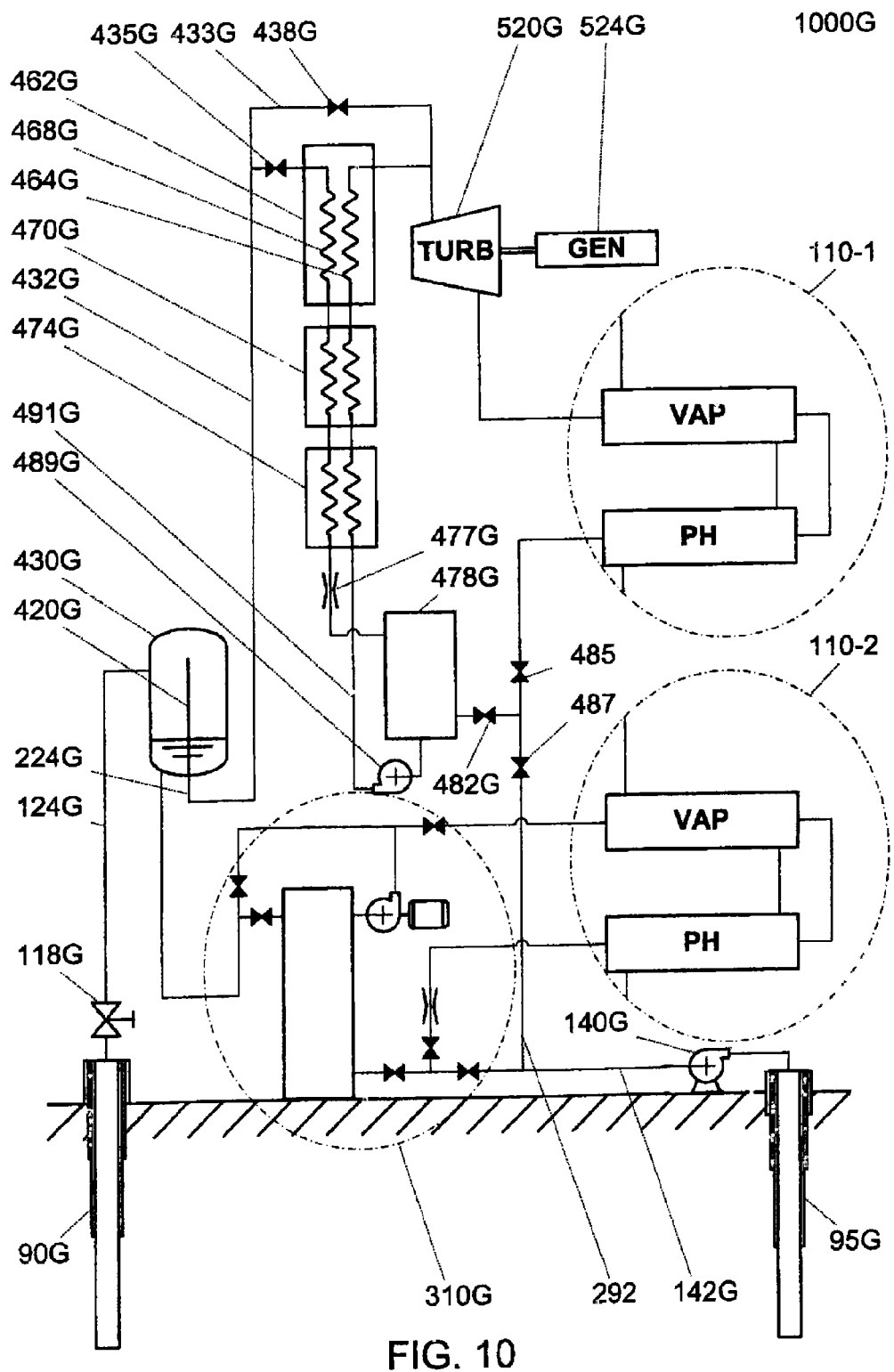
FIG. 10 is a diagram of a geothermal power plant, according to a still further additional embodiment of the present invention.

Another embodiment of the present invention, described with reference to FIG. 10, steam-binary integrated system is described and relates to further curtailment options. System 1000G comprises a combined steam/brine production well 90G which in regular operation supplies the steam/brine mixture to a separation vessel 430G through a control valve 118G and production line 124G. The liquid is separated from the steam and flows via brine line 224G to a brine unit similar to the one described in FIG. 2, which is here divided between a storage system 310G and power generation unit 110-2. The heat depleted brine exiting this unit flows via pipe 142G to the injection pump 140G and the injection well 95G. In cases where the separated brine mass is not sufficient for power generation, this unit may be eliminated and the brine will flow directly to the injection well. On the other hand, if brine mass flow is high, then several power plants can be connected in parallel although only one is shown as 110G-2 in FIG. 11. During low energy demand the brine is stored in storage system 312G, similar to that which has been described for the basic design in FIG. 2 and the other the previous options.

The separated steam flows via line 420G in the separator to line 432G. In regular operation mode the valve 435G that connects to the storage system is closed and valve 438G is opened. Steam flows via the by-pass 433G to the steam turbine 520G turning the generator 524G and the steam that exits the turbine flows to the power unit 110G-1 where it condenses and flows out as condensate to line 292 and the injection line 142G, the injection pump 140G and the injection well 95G. Depending on the steam mass flow, there may be more than one power unit 110G-1 at the tail of the steam turbine exit even if only one unit is shown in FIG. 10.

Live steam is difficult to store especially when temperatures are high and pressure tanks may be very thick and therefore expensive. However, the steam heat, both latent and sensible can be stored in PCM, molten salts or thermal oils with relative small loss of temperature and heat. Even so, such storage systems as are disclosed in U.S. patent application Ser. Nos. 12/621,899; 12/624,063; 13/474,375; and 14/029,599 can be used. Let us assume a Phase Changer material (PCM) in the present case.

When the power from the whole system must be reduced or cut off for a defined period the steam flow is turned to the storage system by opening of valve 435G and closing valve 438G. To minimize the temperature and heat losses, PCM can be actually a cascading system of at least three temperatures while the higher temperature PCM 462G condenses the steam and selecting the PCM material at a high temperature with the consecutive PCM units 470G and 474G cooling the condensate and reducing its temperature to such a temperature so that the equilibrium pressure enables use of regular pressure vessels. For example, a pressure of about 10 bars (equilibrium temperature of 180° C.) requires tanks of about 1 inch wall thickness at 3 m diameter. The condensate exits the lower temperature PCM unit 474G through a restriction valve 477G and is stored in the pressure tank 478G. Valve 485 that connects the storage tank to the injection lines is closed.

When steam is stored in the PCM units, the separated brine is stored in the storage system 310G in a manner similar to that already described with reference to FIG. 2 and the other optional configurations.

When power from the storage is recovered, the condensate is pumped by the storage circulation pump 489G back through the PCM cascade. First, it is heated by the lower temperature PCM 474G, then by the medium temperature PCM 470G and thereafter, the liquid is vaporized in the high temperature PCM 462O. The steam flows to the steam turbine 520G and then condenses in the vaporizer of the power unit 110—land from there through valves 482ZG, 487, lines 292 and 142G to the injection pump 140G and the injection well 95G. The size of the PCM units and the capacity of the storage tank(s) 478G and 310G are designed to suit the period of storage pre designed for the complete power generation system 1000G.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for producing power using a geothermal heat source fluid from a geothermal fluid source, comprising the steps of:
    (a) increasing a power level produced by a Rankine cycle power plant producing power by operating on the geothermal heat source fluid during a first period of time by stopping an injection pump during said first period of time from injecting said geothermal fluid from said geothermal fluid source into an injection well; and
    (b) storing heat during the first period of time.

2. The method according to claim 1, wherein said first period of time comprises a time of peak power demand.

3. A power plant according to claim 1, wherein said storing step comprises storing said geothermal fluid in at least one pressure vessel.

4. The method according to claim 1, wherein said storing step comprises storing said geothermal fluid in a storage pond.

5. The method according to claim 4, wherein said storage pond is evacuated by the pump during a second period of time.

6. The method according to claim 5, wherein said second period of time comprises a time of off-peak power demand.

7. A method for producing power using a geothermal fluid, comprising the steps of:
    extracting a geothermal fluid from a heat source using a geothermal fluid production well;
    producing power by a power plant operating on the geothermal fluid, resulting in a partially heat depleted geothermal fluid;
    using a certain amount of power to operate an injection pump to inject the partially heat depleted geothermal fluid from the power plant into a geothermal fluid injection well;
    stopping the operating of the pump to inject the partially heat depleted geothermal fluid into the geothermal fluid injection well during a first period of time, whereby a power level produced by the power plant during the first period of time is increased by the certain amount of power;
    storing the partially heat depleted geothermal fluid outside of the geothermal fluid injection well during the first period of time; and
    injecting the stored geothermal fluid into the geothermal fluid injection well and back to the geothermal fluid heat source during a second period of time.

8. The method according to claim 7, wherein said second period of time comprises a time of off-peak power demand.

9. The method according to claim 7, wherein the power plant is a Rankine cycle power plant.

10. The method according to claim 7, wherein said first period of time comprises a time of peak power demand.

11. The method according to claim 10, wherein said step of storing the heat of the partially heat depleted geothermal fluid during the first period of time comprises storing said geothermal fluid in at least one pressure vessel.

12. The method according to claim 10, wherein said step of storing the heat of the partially heat depleted geothermal fluid during the first period of time comprises storing said geothermal fluid in a storage pond.

13. The method according to claim 12, wherein said storage pond is evacuated by the pump during the second period of time.

* * * * *